US011906123B2

(12) United States Patent
Ichikawa et al.

(10) Patent No.: US 11,906,123 B2
(45) Date of Patent: Feb. 20, 2024

(54) LIGHT SOURCE MODULE

(71) Applicant: KOITO MANUFACTURING CO., LTD., Tokyo (JP)

(72) Inventors: Tomoyuki Ichikawa, Shizuoka (JP); Norikazu Saito, Shizuoka (JP); Atsushi Ozawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/589,006

(22) Filed: Jan. 31, 2022

(65) Prior Publication Data

US 2022/0154905 A1 May 19, 2022

Related U.S. Application Data

(63) Continuation of application No. PCT/JP2020/029347, filed on Jul. 30, 2020.

(30) Foreign Application Priority Data

Aug. 1, 2019 (JP) .................. 2019-142221
Aug. 1, 2019 (JP) .................. 2019-142222
Jul. 9, 2020 (JP) .................. 2020-118473

(51) Int. Cl.
*F21S 41/663* (2018.01)
*F21S 41/25* (2018.01)
(Continued)

(52) U.S. Cl.
CPC ........... *F21S 41/663* (2018.01); *F21S 41/143* (2018.01); *F21S 41/148* (2018.01); *F21S 41/25* (2018.01); *F21S 45/47* (2018.01); *F21W 2102/13* (2018.01)

(58) Field of Classification Search
CPC ........ H05B 45/30; H05B 45/44; H05B 45/46; H05B 45/48; H05B 45/10; H05B 47/10; B60Q 1/1407
See application file for complete search history.

(56) References Cited

U.S. PATENT DOCUMENTS

2013/0320850 A1* 12/2013 Nakamura ............. H05B 47/24
315/186
2015/0069909 A1 3/2015 Suganuma et al.
(Continued)

FOREIGN PATENT DOCUMENTS

CN 206797244 U 12/2017
JP 2011129283 A 6/2011
(Continued)

OTHER PUBLICATIONS

International Search Report (PCT/ISA/210) with translation dated Oct. 13, 2020, by the Japan Patent Office as the International Searching Authority for International Application No. PCT/JP2020/029347. (12 pages).

(Continued)

*Primary Examiner* — Elmito Breval
(74) *Attorney, Agent, or Firm* — BUCHANAN INGERSOLL & ROONEY PC

(57) ABSTRACT

A light source module is switchable between a high beam and a low beam, and is mounted on a vehicle. A first light source is arranged such that its output light is irradiated to a low-beam region by a first optical system. A second light source is arranged such that its output light is irradiated to a high-beam region by a second optical system. A lighting circuit supplies a driving current to the first light source in response to a turn-on instruction for either the high beam or the low beam. Furthermore, the lighting circuit supplies the (Continued)

output current to the second light source in response to a turn-on instruction for the high beam.

19 Claims, 20 Drawing Sheets

(51) Int. Cl.
        *F21S 41/143*    (2018.01)
        *F21S 41/148*    (2018.01)
        *F21S 45/47*     (2018.01)
        *F21W 102/13*    (2018.01)

(56) References Cited

U.S. PATENT DOCUMENTS

| | | |
|---|---|---|
| 2017/0210279 A1 | 7/2017 | Sugiyama et al. |
| 2017/0343173 A1 | 11/2017 | Takada et al. |
| 2018/0038570 A1 | 2/2018 | Kanayama et al. |
| 2018/0049286 A1* | 2/2018 | Matsui .................. H05B 45/30 |
| 2019/0226658 A1 | 7/2019 | Kawai et al. |

FOREIGN PATENT DOCUMENTS

| | | |
|---|---|---|
| JP | 2014107049 A | 6/2014 |
| JP | 2015054555 A | 3/2015 |
| JP | 2017069150 A | 4/2017 |
| JP | 2017212167 A | 11/2017 |
| JP | 2018026267 A | 2/2018 |
| WO | 2018043663 A1 | 3/2018 |

OTHER PUBLICATIONS

International Preliminary Report on Patentability (Form PCT/IB/373) and Written Opinion (PCT/ISA/237) with translation dated Feb. 1, 2022, by the Japan Patent Office as the International Searching Authority for International Application No. PCT/JP2020/029347. (20 pages).

Communication pursuant to Rule 164(1) EPC (Supplementary Partial European Search Report) dated Aug. 23, 2022, issued in corresponding European Patent Application No. 20847110.2. (15 pages).

JP Notice of Reasons for Refusal issued in JP Application No. 2021-535444; dated Jan. 9, 2024. 9 Pages (with Translation).

* cited by examiner

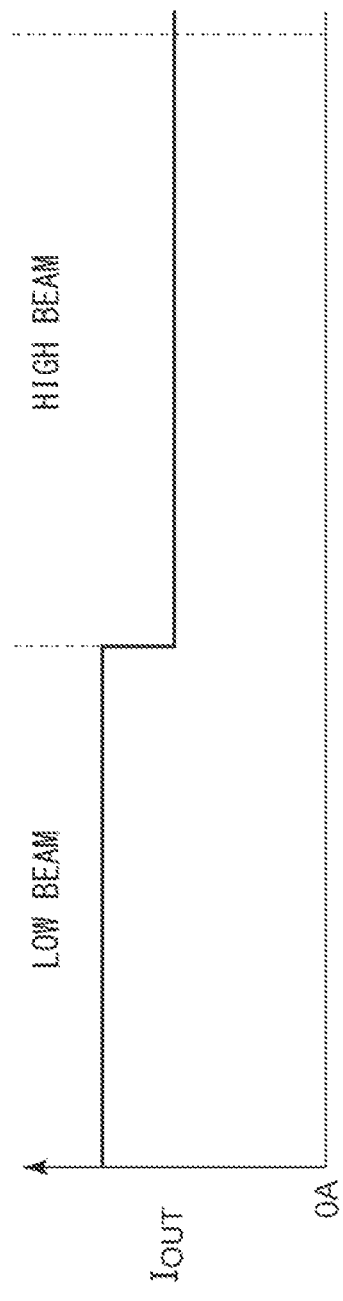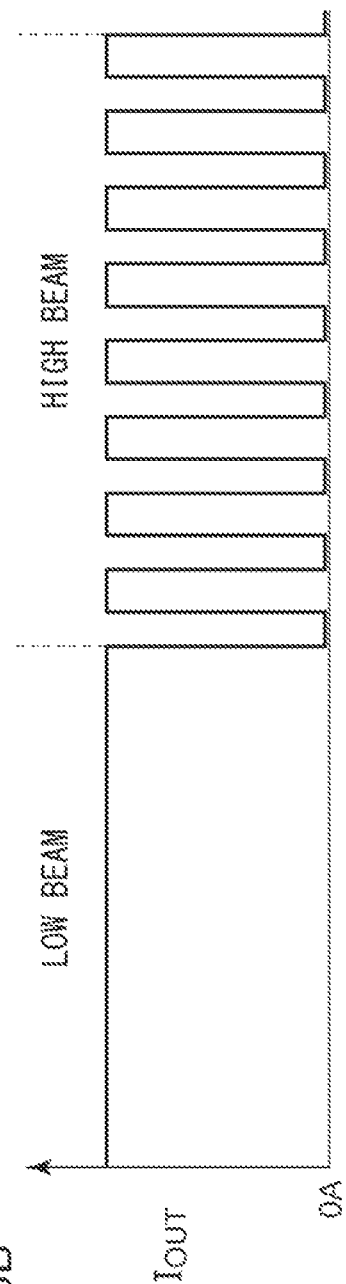

LIGHT SOURCE MODULE

BACKGROUND

1. Technical Field

The present disclosure relates to a lamp employed in a vehicle such as a motorcycle or the like.

2. Description of the Related Art

In conventional motorcycles, a high-beam light source and a low-beam light source are individually driven by two independent lighting circuits. In many cases, a similar configuration is employed in vehicles other than motorcycles. This leads to a lamp having a complicated configuration, and troublesome maintenance.

SUMMARY

The present disclosure has been made in view of such a situation.

1. An embodiment of the present disclosure relates to a light source module for a vehicle structured to be switchable between a high beam and a low beam. The light source module includes: a first light source arranged such that its output light is irradiated to a low-beam region by a first optical system; a second light source arranged such that its output light is irradiated to a high-beam region by a second optical system; and a lighting circuit structured to supply a driving current to the first light source in response to any one from among a turn-on instruction for the high beam and a turn-on instruction for the low beam, and to supply the driving current to the second light source in response to the turn-on instruction for the high beam.

Also, the first light source and the second light source may be coupled in series. Also, the lighting circuit may include: a driving circuit structured to supply the driving current to a series connection circuit of the first light source and the second light source; and a bypass switch arranged in parallel with the second light source, and structured to be turned off during a period in which the turn-on instruction for the high beam occurs, and to be turned on during a period in which the turn-on instruction for the low beam occurs.

Also, in the on state of the bypass switch, the driving circuit may reduce the driving current as compared with that in the off state of the bypass switch. This arrangement is capable of suppressing an increase in power consumption and heat generation in the high beam turn-on state.

Also, the first light source and the second light source may be arranged in a predetermined direction on a face that is orthogonal to the ground. Also, the first optical system and the second optical system may each be structured as a lens optical system. Also, the predetermined direction may be the horizontal direction.

Also, the first light source may include a first semiconductor light-emitting element and a second semiconductor light-emitting element. Also, the second light source may include a third semiconductor light-emitting element. Also, the first optical system may include: a first lens structured to receive an output light of the first semiconductor light-emitting element so as to form a light distribution for a region below an elbow point of the low-beam region; and a second lens structured to receive an output light of the second semiconductor light-emitting element so as to form a light distribution for a region above an elbow point of the low-beam region. Also, the second optical system may include a third lens structured to receive an output light of the third semiconductor light-emitting element so as to illuminate the high-beam region.

Also, the first light source may be mounted on a first face that is parallel to the ground. Also, the second light source may be mounted on a third face that is opposite to the first face. Also, the first optical system may include a first reflector provided to the first face side. Also, the second optical system may include a second reflector provided to the third face side.

Also, the first light source may be mounted on a first face that is parallel to the ground. Also, the second light source may be mounted on a second face that is orthogonal to the ground. Also, the first optical system may include a reflective optical system. Also, the second optical system may include a transmissive optical system.

Also, the first light source may include multiple light-emitting elements arranged adjacent to each other in the horizontal direction.

Also, the light source module may further include a third light source arranged such that its output light is irradiated to the low-beam region by the first optical system. Also, the lighting circuit may be structured to supply the driving current to the third light source in response to a turn-on instruction for the low beam.

Also, the lighting circuit may include: a first switch structured to turn on in response to a turn-on instruction for the low beam; a second switch structured to turn on in response to a turn-on instruction for the high beam; and a driving circuit structured to generate the driving current. Also, the first light source, the third light source, and the first switch may be coupled in series. Also, the second light source and the second switch may be coupled in parallel with the third light source and the first switch.

Also, the first light source and the third light source may be mounted on a first face that is parallel to the ground. Also, the second light source may be mounted on a third face that is opposite to the first face. Also, the first optical system may include a first reflector provided on the first face side. Also, the second optical system may include a second reflector provided on the third face side.

Also, the first light source and the third light source may be mounted on a first face that is parallel to the ground. Also, the second light source may be mounted on a second face that is orthogonal to the ground. Also, the first optical system may include a reflective optical system. Also, the second optical system may include a transmissive optical system.

Also, the first light source and the third light source may include multiple light-emitting elements arranged adjacent to each other in the horizontal direction.

Also, the second light source may include multiple light-emitting elements arranged adjacent to each other in the horizontal direction.

Another embodiment of the present disclosure also relates to a light source module for a vehicle structured to be switchable between a high beam and a low beam. The light source module includes: a first light source arranged such that its output light is irradiated to a low-beam region by a first optical system; a second light source arranged such that its output light is irradiated to a high-beam region by a second optical system; a heatsink structured to be thermally coupled to the first light source and the second light source; and a lighting circuit structured to supply a driving current to the first light source and the second light source.

Also, the light source module may further include a third light source arranged such that its output light is irradiated to the low-beam region by the first optical system.

Yet another embodiment of the present disclosure relates to a light source module for a vehicle structured to be switchable between a high beam and a low beam. The light source module includes: a first light source for a low beam; a first switch arranged in parallel with the first light source; a second light source for a low beam and a second switch coupled in series with the first light source;

a third light source for a high beam and a third switch arranged in series such that they form a path that is parallel to the second light source and the second switch; and a driving circuit structured to generate a driving current in response to any one from among the high beam turn-on instruction and the low beam turn-on instruction.

With this embodiment, this requires only a single driving circuit to enable switching between the high beam and the low beam. Furthermore, when a disconnection has occurred in any path, the combination of the on/off states of the first switch through the third switch is switched so as to supply the driving current to a path in which a disconnection has not occurred. This allows continuous illumination in front of the vehicle.

Also, the light source module may further include a controller structured such that, in a normal state, (i) in response to the low beam turn-on instruction, the controller turns off the first switch, turn on the second switch, and turns off the third switch, and (ii) in response to the high beam turn-on instruction, the controller turns off the first switch and the second switch, and turns on the third switch.

Also, upon detecting a current cutoff state, the controller may set the first switch to the on state. With this, when a disconnection has occurred in the first light source, this allows the driving current to be bypassed via the first switch so as to continuously supply the driving current to the second light source or the third light source. This allows continuous illumination in front of the vehicle.

Also, when the current cutoff state has been continuously detected over a predetermined first time after the first switch is set to the on state, the controller may turn off the first switch. When a problem of a current disconnection cannot be resolved even after the first switch is set to the on state, judgement can be made that such a disconnection portion has occurred in a component that differs from the first light source. In this case, the first switch is turned off so as to allow the first light source to turn on, thereby suppressing a reduction of the light intensity in the low-beam region.

Also, the first time may be 2 ms to 500 ms. With such an arrangement in which such a period in which the field of vision becomes dark is set to such a short period of time, this allows the driver to continue to drive the vehicle.

Also, when a state in which the driving current is zero continues over a predetermined second time, the controller may judge that a current cutoff state has occurred. With this, such an arrangement is capable of preventing false detection due to noise.

Also, during a period in which the first switch is fixedly set to the on state, the controller may turn on the second switch regardless of the high beam or the low beam turn-on instruction. This disables manual switching between the high beam and the low beam, thereby allowing the driver to be notified of the occurrence of a disconnection malfunction. Furthermore, the light source module is fixedly set to the low beam, thereby preventing glare from being imparted to traffic participants in the vicinity.

Also, during a period in which the first switch is fixedly set to the on state, the controller may turn on the third switch regardless of the high beam or the low beam turn-on instruction. This disables manual switching between the high beam and the low beam, thereby allowing the driver to be notified of the occurrence of a disconnection malfunction. Also, in general, there are more opportunities for the vehicle to travel in the low-beam mode. Accordingly, with such an arrangement in which only the high beam is enabled and the low beam is disabled, this allows the driver to easily notice a disconnection malfunction.

It should be noted that any combination of the components described above or any component or any manifestation of the present invention may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 8A and 8B are diagrams for explaining an example of the control of the driving current $I_{OUT}$;

DETAILED DESCRIPTION

Figure 1:
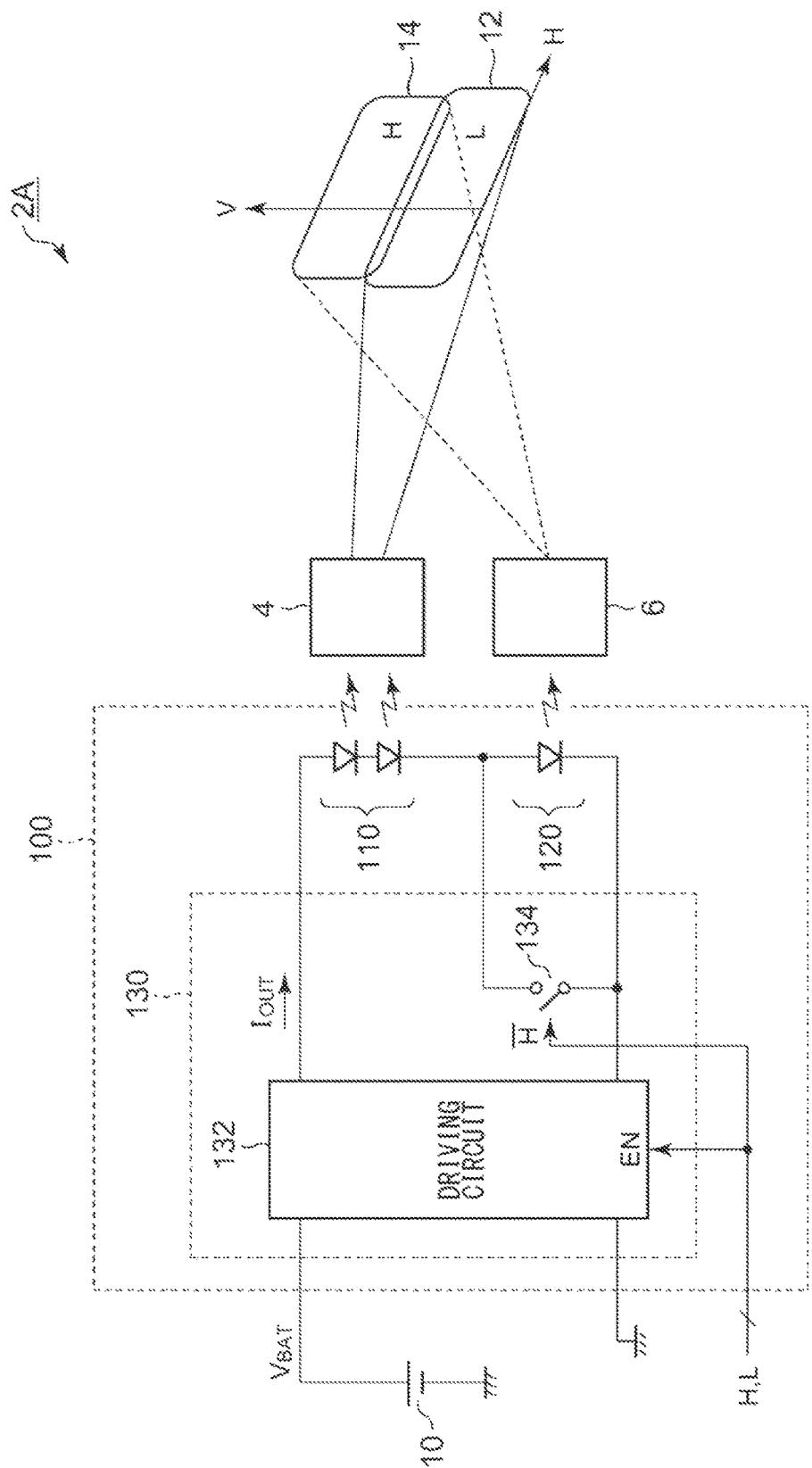
FIG. 1 is a diagram showing a headlamp provided with a light source module according to an embodiment 1.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Embodiment 1

FIG. 1 is a diagram showing a headlamp 2A provided with a light source module 100 according to an embodiment 1. The headlamp 2A is mounted on a motorcycle and is capable of switching between a high beam and a low beam. The headlamp 2A includes a light source module 100, a first optical system 4, and a second optical system 6.

The light source module 100 includes a first light source 110, a second light source 120, a lighting circuit 130, and an unshown heatsink in the form of a module. The first light source 110 is arranged such that its output light is irradiated to a low-beam region 12 on a virtual vertical screen by means of the first optical system 4. The second light source 120 is arranged such that its output light is irradiated to a high-beam region 14 by means of the second optical system 6. The first light source 110 and the second light source 120 each include at least one semiconductor light-emitting element, examples of which include a light-emitting diode (LED), laser diode (LD), and organic EL element.

The light source module 100 receives a turn-on instruction for the high beam and low beam input from a vehicle side. Upon receiving a turn-on instruction for either the high beam or low beam, the lighting circuit 130 supplies a driving current $I_{OUT}$ to the first light source 110. Furthermore, the lighting circuit 130 is configured to supply the driving current $I_{OUT}$ to the second light source 120 in response to a turn-on instruction for the high beam.

In the embodiment, the first light source 110 and the second light source 120 are coupled in series. Furthermore, the lighting circuit 130 includes a driving circuit 132 configured as a constant current driver and a bypass switch 134. In the turn-on state of the high beam or the low beam, the driving circuit 132 is enabled. In this state, the driving circuit 132 supplies the driving current $I_{OUT}$ to a series connection circuit formed of the first light source 110 and the second light source 120.

The bypass switch 134 is arranged in parallel with the second light source 120. During a period of a high beam turn-on instruction, the bypass switch 134 is turned off. Conversely, during a period of a low beam turn-on instruction, the bypass switch 134 is turned on.

In the example, the first light source 110 includes two LEDs. On the other hand, the second light source 120 includes a single LED. Accordingly, a total of three LEDs are arranged in series on a driving path of the driving circuit 132. Typically, the voltage $V_{BAT}$ of a battery 10 mounted on a motorcycle, i.e., the power supply voltage of the driving circuit 132, is 12 V. In contrast, a white LED has a forward voltage on the order of 3.5 V. Accordingly, the voltage across both ends of a load of the driving circuit 132 is on the order of 10.5 V (=3.5 V×3), which is lower than the battery voltage $V_{BAT}$. Accordingly, the driving circuit 132 can be configured as a step-down switching converter or a linear regulator.

The above is the configuration of the light source module 100. Next, description will be made regarding the operation thereof.

In a state in which neither the high beam turn-on instruction nor the low beam turn-on instruction occurs, the driving circuit 132 is disabled. In this state, the driving current $I_{OUT}$ is not generated.

If either the high beam turn-on instruction or the low beam turn-on instruction occurs, the driving circuit 132 is enabled. In this state, the driving current $I_{OUT}$ is generated such that it is stabilized to a predetermined current amount.

During a period in which the low beam turn-on instruction occurs, the bypass switch 134 is turned on. In this state, the driving current $I_{OUT}$ flows through the first light source 110 and the bypass switch 134. Accordingly, the second light source 120 is turned off, and only the first light source 110 is turned on. In this state, the low-beam region 12 is illuminated.

During a period in which the high beam turn-on instruction occurs, the bypass switch 134 is turned off. In this state, the driving current $I_{OUT}$ flows through the first light source 110 and the second light source 120, and both the first light source 110 and the second light source 120 turn on. In this state, both the low-beam region 12 and the high-beam region 14 are illuminated.

Figure 2:
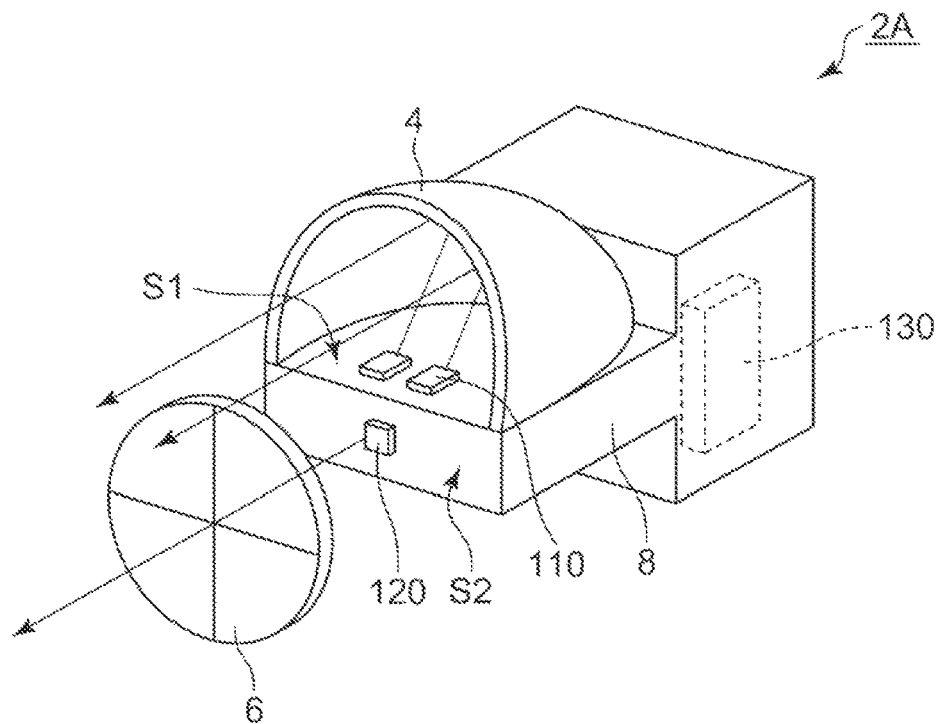
FIG. 2 is a perspective diagram showing an example of the layout of the headlamp.

FIG. 2 is a perspective view showing an example of the layout of the headlamp 2A. The first light source 110 is mounted on a first face S1 which is parallel to the ground. The second light source 120 is mounted on a second face S2 which is orthogonal to the ground. The first face S1 and the second face S2 respectively correspond to the surfaces of a block-shaped heatsink 8.

Preferably, the two light-emitting elements that form the first light source 110 are arranged side-by-side in the horizontal direction. This allows a cut line, which is a boundary between the high-beam region and the low-beam region, to be easily formed in the horizontal direction.

The first optical system 4 includes a reflective optical system, i.e., a mirror. The second optical system 6 includes a transmissive optical system, i.e., a lens. The lighting circuit 130 is mounted on the heatsink 8. For example, the heatsink 8 has a cavity or a recess portion as its internal portion. The lighting circuit 130 may be fixedly mounted on the cavity or the recess portion such that they are in contact with each other.

Figure 3:
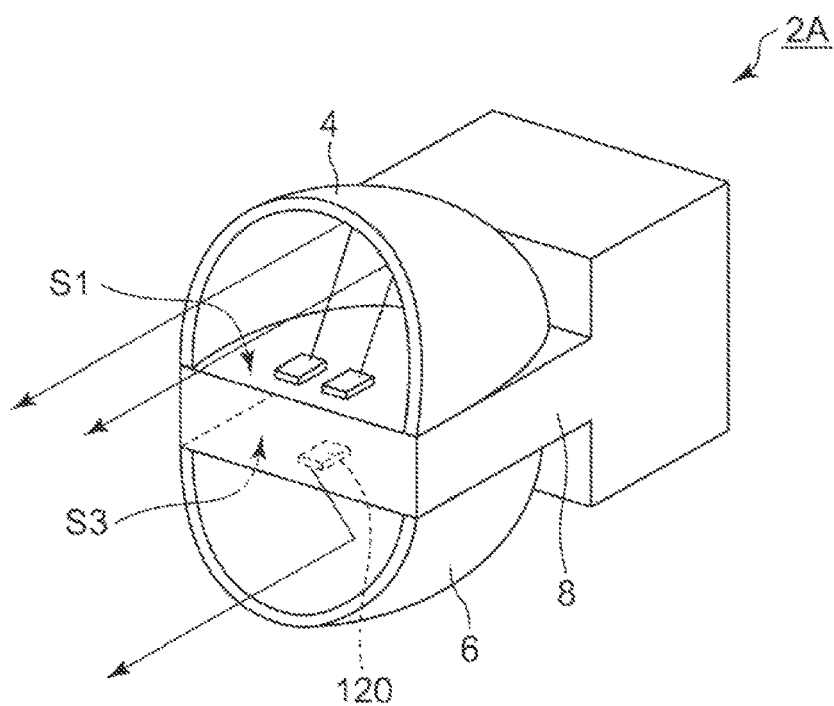
FIG. 3 is a perspective diagram showing another example of the layout of the headlamp.

FIG. 3 is a perspective diagram showing another example of the layout of the headlamp 2A. The first light source 110 is mounted on the first face S1 which is parallel to the ground. The second light source 120 is mounted on a third face S3 which is opposite to the first face S1. The first optical system 4 includes a first reflector arranged on the first face S1 side. The second optical system 6 includes a second reflector arranged on the third face side.

With such an arrangement shown in FIG. 3, the two light-emitting elements that form the first light source 110 are also arranged side-by-side in the horizontal direction. This allows a cut line, which is a boundary between the high-beam region and the low-beam region, to be easily formed in the horizontal direction.

Figure 4:
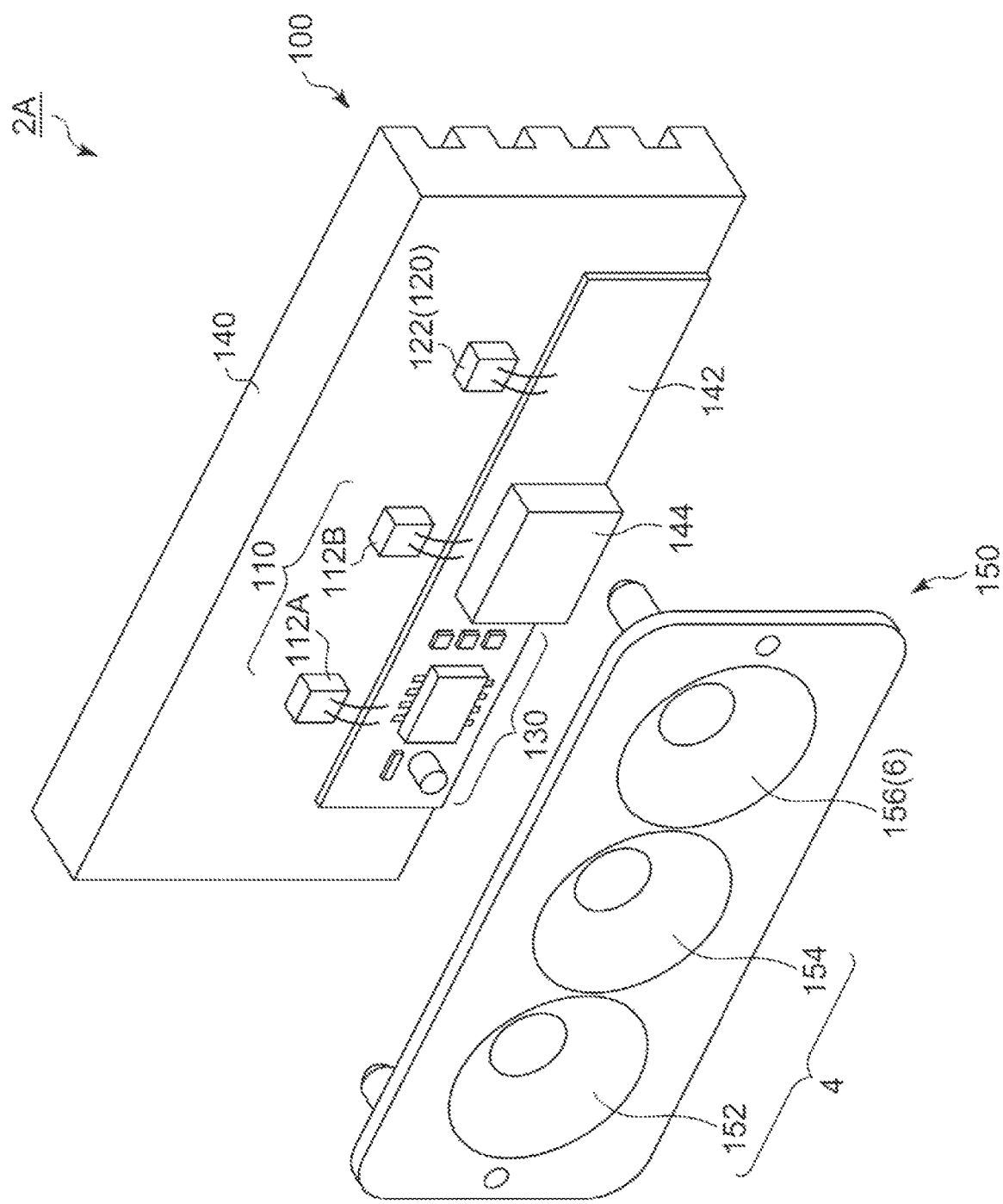
FIG. 4 is a perspective diagram showing yet another example of the layout of the headlamp.

FIG. 4 is a perspective diagram showing yet another example of the layout of the headlamp 2A. The headlamp 2A includes a light source module 100 and a lens module 150. The light source module 100 includes a first light source 110, a second light source 120, a lighting circuit 130, a heatsink 140, a printed circuit board 142, and a connector 144. The first light source 110 includes a first semiconductor light-emitting element 112A and a second light-emitting element 112B. The second light source 120 includes a third semiconductor light-emitting element 122.

The first semiconductor light-emitting element 112A, the second semiconductor light-emitting element 112B, and the third semiconductor light-emitting element 122 are mounted on the heatsink 140 side-by-side in a predetermined direction. In this example, as the predetermined direction, the horizontal direction is employed. The order of the first semiconductor light-emitting element 112A, the second semiconductor light-emitting element 112B, and the third semiconductor light-emitting element 122 may be switched. The first semiconductor light-emitting element 112A, the second semiconductor light-emitting element 112B, and the third semiconductor light-emitting element 122 each have an anode electrode and a cathode electrode on their surface.

The components that form the lighting circuit 130 as well as a connector 144 are mounted on the printed circuit board 142. The wiring of the printed circuit board 142 is coupled to electrodes of the first semiconductor light-emitting element 112A, the second semiconductor light-emitting element 112B, and the third semiconductor light-emitting element 122.

The lens module 150 includes a first lens 152 and a second lens 154 that correspond to the first optical system 4, and a third lens 156 that corresponds to the second optical system 6. The first lens 152 receives an output beam of the first semiconductor light-emitting element 112A, and projects the output beam in front of the vehicle. The second lens 154 receives an output beam of the second semiconductor light-emitting element 112B, and projects the output beam in front of the vehicle. The third lens 154 receives an output beam of the third semiconductor light-emitting element 122, and projects the output beam in front of the vehicle.

Figure 5:
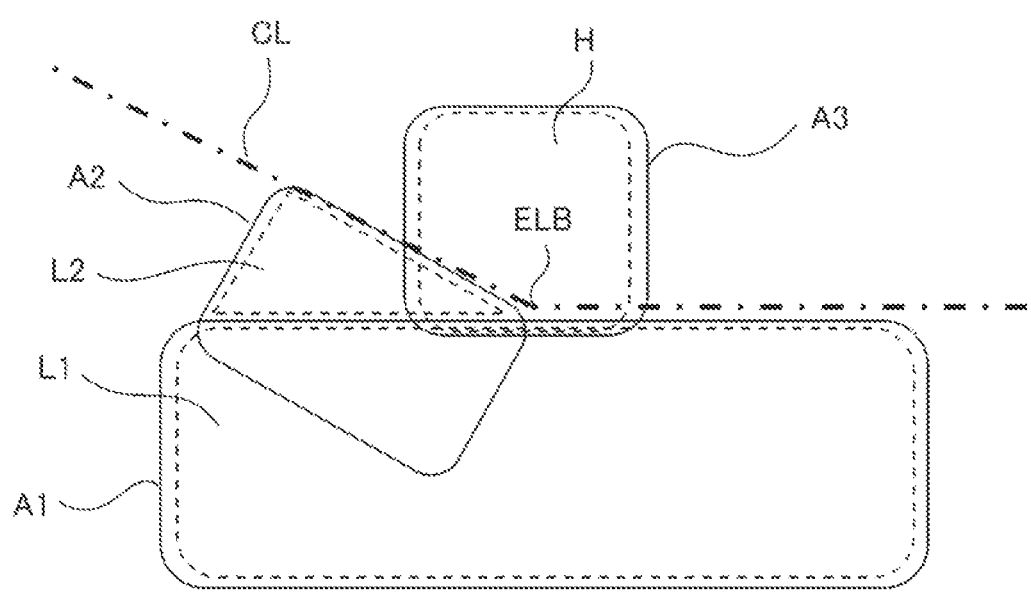
FIG. 5 is a diagram showing a light distribution formed by the headlamp shown in FIG. 4.

FIG. 5 is a diagram showing the light distribution formed by the headlamp 2A shown in FIG. 4. The line of alternately long and short dashes indicates the cutoff line CL. The low-beam light distribution is formed below the cutoff line CL. On the other hand, the high-beam light distribution is formed above the cutoff line CL.

The low-beam region includes a first portion L1 below a horizontal line that passes through an elbow point ELB and a second portion L2 that is above it. The first lens 152 forms a light distribution A1 that mainly covers the first portion L1. The second lens 154 forms a light distribution A2 that mainly covers the second portion L2. Furthermore, the third lens 156 forms a light distribution A3 that mainly covers a high-beam region H.

Embodiment 2

Description has been made in the embodiment 1 regarding an arrangement in which the driving current $I_{OUT}$ generated by the driving circuit 132 is constant regardless of the lighting mode (low-beam mode or high-beam mode) of the headlamp 2A. For this reason, power consumption, i.e., heat generation, in the high-beam mode becomes larger than that in the low-beam mode. Specifically, in a case in which the first light source 110 includes two LED chips and the second light source 110 includes a single LED chip as shown in FIG. 1, the heat generated in the high-beam mode is 1.5 times the heat generated in the low-beam mode. In some cases, this requires a heatsink to be formed with a larger size.

Figure 6:
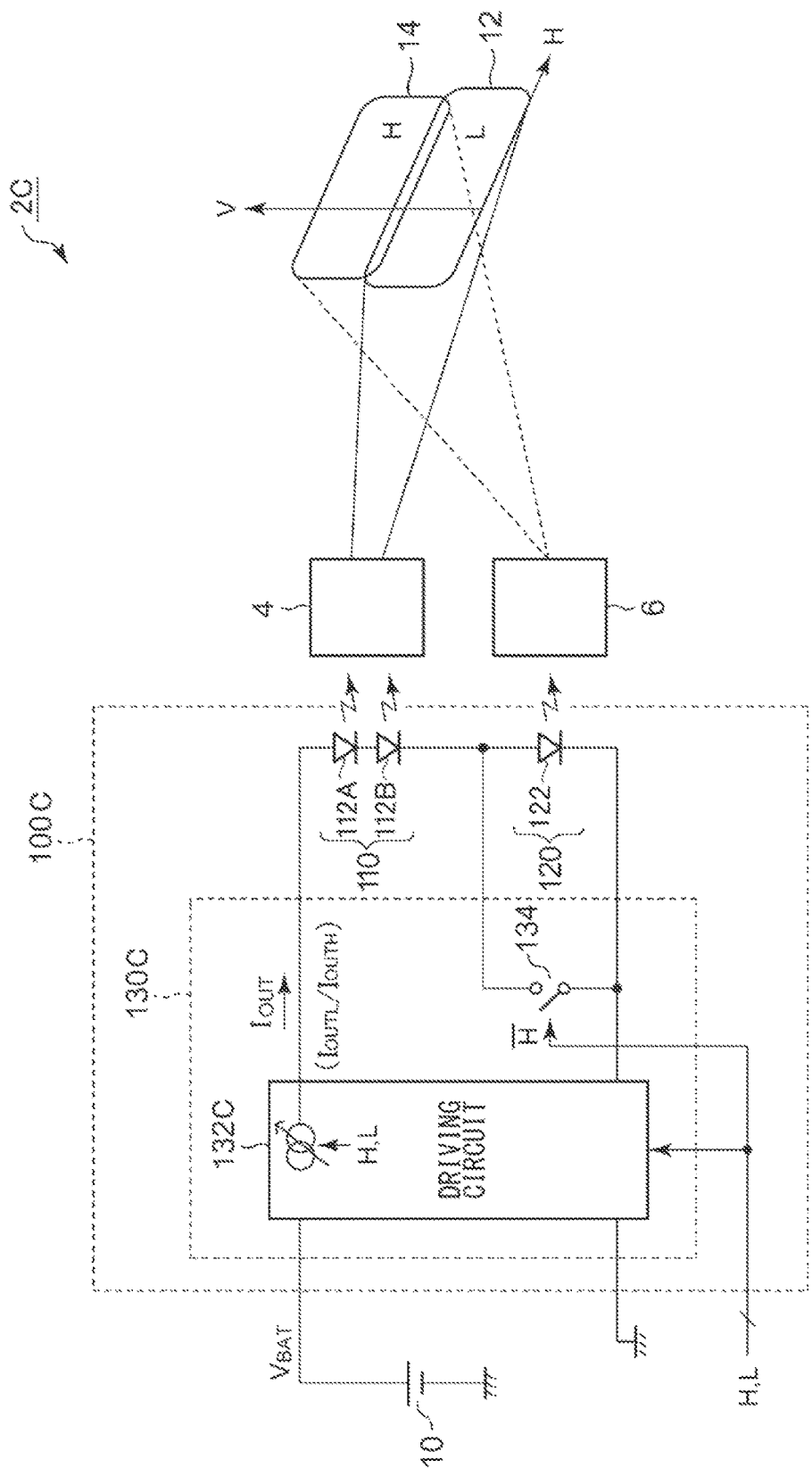
FIG. 6 is a diagram showing a headlamp provided with a light source module according to an embodiment 2.

FIG. 6 is a diagram showing a headlamp 2C provided with a light source module 100C according to an embodiment 2. Description will be made regarding the configuration of the light source module 100C directing attention to the points of difference from the light source module 100 according to the embodiment 1.

The lighting circuit 130C includes a driving circuit 132C and a bypass switch 134. In the present embodiment, the driving circuit 132C is configured to be capable of switching the amount of current (time average value) of the driving current $I_{OUT}$ according to the mode, i.e., the high-beam mode or the low-beam mode. Specifically, the driving current $I_{OUT}$ is controlled such that the amount of current $I_{OUTH}$ of the driving current $I_{OUT}$ in the high-beam mode is smaller than the amount of current $I_{OUTL}$ of the driving current $I_{OUT}$ in the low-beam mode.

$I_{OUTH} < I_{OUTL}$

Description will be made assuming that the first light source 110 includes two semiconductor light-emitting elements 112A and 112B, and the second light source 120 includes a single semiconductor light-emitting element 122. In this case, assuming that $I_{OUTH}$ is on the order of ⅔ times the value of $I_{OUTL}$, this allows the power consumption in the high-beam mode to be reduced to a level that is substantially the same as the power consumption in the low-beam mode. It should be noted $I_{OUTH}$ may be larger than ⅔ times the value of $I_{OUTL}$. As $I_{OUTH}$ becomes larger than (⅔×$I_{OUTL}$), the light intensity in the high-beam mode becomes higher. However, this degrades the effects of power consumption reduction.

Furthermore, as a result of reducing the power consumption, i.e., the heat generation, this allows the heatsink to be configured with a compact size. Alternatively, this allows the heatsink to be replaced by a cooling mechanism having a simpler configuration.

Figure 7:
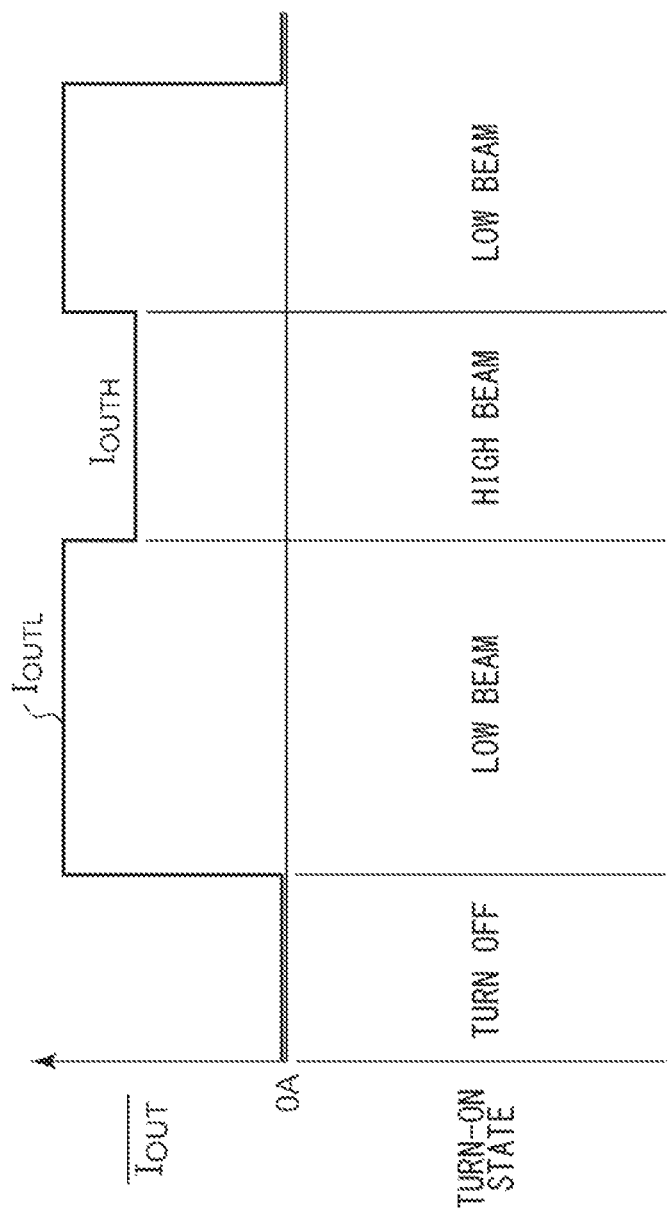
FIG. 7 is an operation waveform diagram showing the operation of the light source module shown in FIG. 6.

FIG. 7 is an operation waveform diagram showing the operation of the light source module 100 shown in FIG. 6. When both the high beam and the low beam are set to the turn-off state, the driving current $I_{OUT}$ becomes zero. During a low beam turn-on period, the time-average amount of the driving current $I_{OUT}$ is stabilized to the first current amount $I_{OUTL}$. During a high beam turn-on period, the time average amount of the driving current $I_{OUT}$ decreases to the second current amount $I_{OUTH}$.

FIGS. 8A and 8B are diagrams for explaining an example of control of the driving current $I_{OUT}$. As shown in FIG. 8A, in the high-beam mode, the driving current $I_{OUT}$ may be reduced using an analog dimming method (current dimming method).

Figure 9:
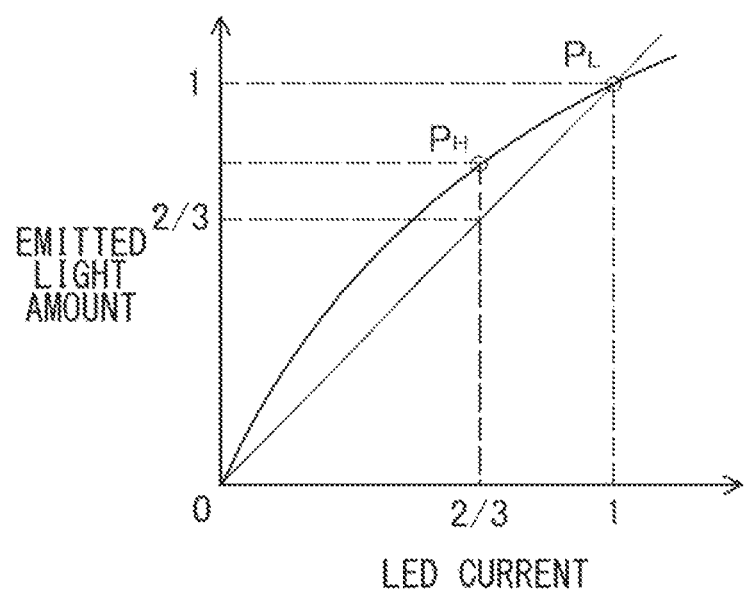
FIG. 9 is a diagram for explaining the advantage of an analog dimming method for reducing the light intensity.

FIG. 9 is a diagram for explaining the advantage of the analog dimming method for reducing the light intensity. The horizontal axis represents the driving current $I_{OUT}$, and the vertical axis represents the light amount emitted by a single light-emitting element. Here, $P_L$ indicates the operating point in the low-beam mode, and $P_H$ indicates the operating point in the high-beam mode. As shown in FIG. 9, as the driving current $I_{OUT}$ becomes smaller, the LED luminous efficiency becomes higher. Accordingly, even if the driving current $I_{OUT}$ is reduced to ⅔ (66.7%), the light amount emitted from the LED does not decrease to ⅔. Rather, the light amount decreases to, for example, ¾ (75%). Accordingly, the total light amount in the high-beam mode is 1.125 (=0.75×3/2) times the total light amount in the low-beam mode. That is to say, the total light amount in the high-beam mode is slightly larger than that in the low-beam mode.

As shown in FIG. 8B, in the high-beam mode, the amount of the driving current $I_{OUT}$ may be reduced using the pulse width modulation (PWM) dimming (light reduction) method. In a case in which the white light source is configured of a blue LED and a yellow fluorescent member, the light-emission color changes depending on the driving current $I_{OUT}$. Accordingly, in a case of employing the analog dimming method, in some cases, this leads to a problem in that there is a difference in the chromaticity between the low beam and the high beam. In a case in which there is a need to suppress the difference in the chromaticity, the PWM dimming method is employed, thereby providing chromaticity matching between the high beam and low beam.

Figure 10:
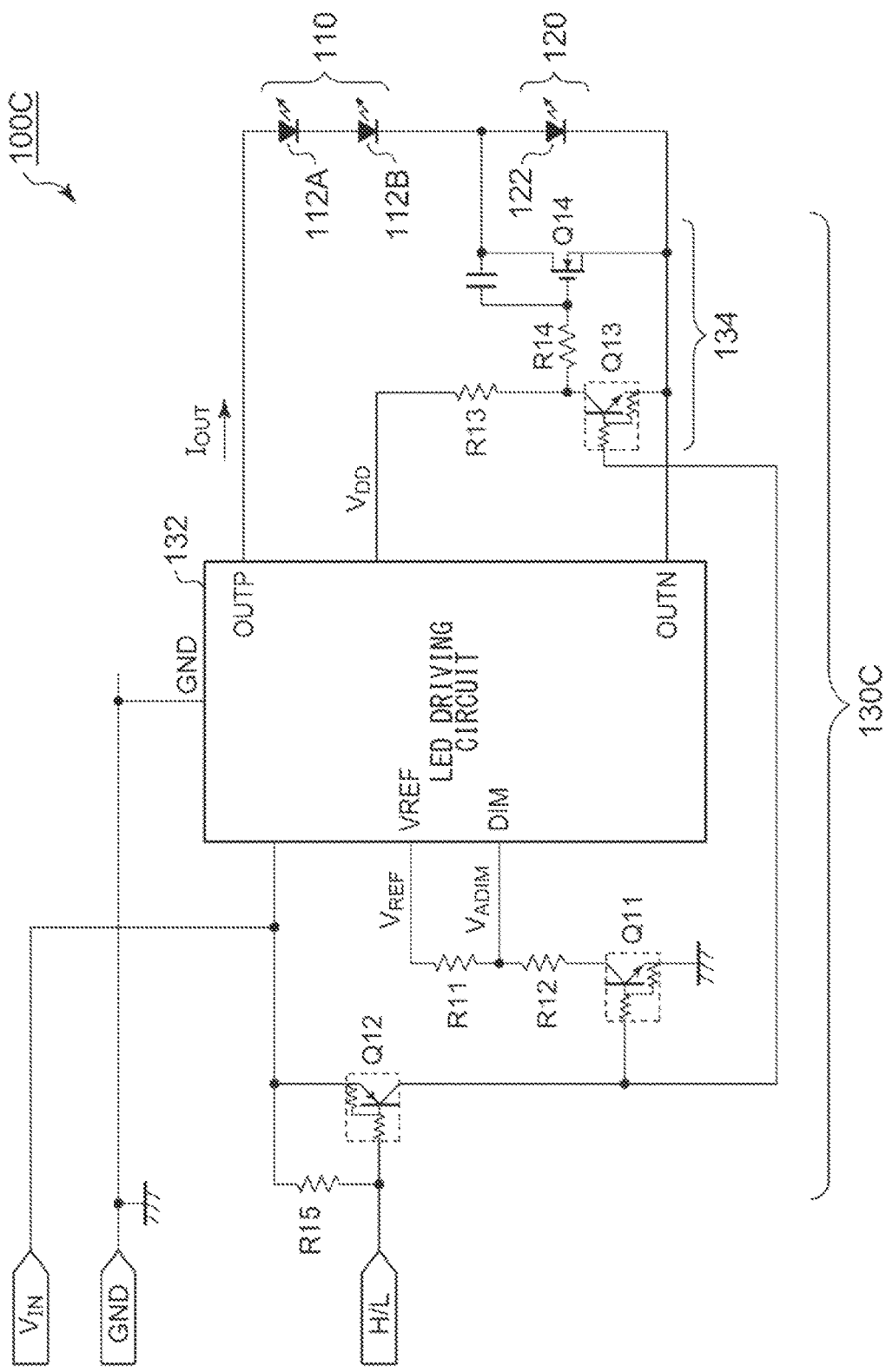
FIG. 10 is a circuit diagram showing an example configuration of a light source module.

FIG. 10 is a circuit diagram showing the optical module 100C. The lighting circuit 130C includes the driving circuit 132C and the bypass switch 134.

The lighting circuit 130C receives a turn-on instruction H/L to be input from an external circuit. In the low-beam mode, the turn-on instruction H/L is set to the first state. In the high-beam mode, the turn-on instruction H/L is set to the second state. For example, in a case in which the external circuit has an open-collector or open-drain output stage, the high-impedance (open) state may be employed as the first state of the turn-on instruction H/L. Furthermore, the low-level state may be employed as the second state thereof. When the turn-on instruction H/L is set to the first state (high-impedance state), the base of a transistor Q12 is pulled up by a resistor R15, thereby turning off the transistor Q12. When the turn-on instruction H/L is set to the second state (low level), the transistor Q12 is turned on. The external circuit that generates the turn-on instruction H/L may have a push-pull output stage. In this case, the high-level state may be employed as the first state of the turn-on instruction H/L, and the low-level state may be employed as the second state thereof.

The driving circuit 132 is configured as a constant current driver. The driving circuit 132 generates a driving voltage across a positive output electrode OUTP and a negative output electrode OUTN, so as to output the driving current $I_{OUT}$ stabilized to a target current. In this example, the driving current $I_{OUT}$ is changed using the analog dimming method. Specifically, the driving circuit 132 has a dimming terminal DIM. The target amount of the driving current $I_{OUT}$ is changed according to a dimming voltage $V_{ADIM}$ input to the dimming terminal DIM.

$$I_{OUT}=K \times V_{ADIM}$$

The driving circuit 132 generates a reference voltage $V_{REF}$. Resistors R11 and R12 and a transistor Q11 are arranged in series between a VREF terminal and the ground. Furthermore, the driving circuit 132 generates a power supply voltage $V_{DD}$. The bypass switch 134 includes resistors R13 and R14 and transistors Q13 and Q14. The resistors R13 and R14 and the transistor Q13 form a gate driver for the bypass transistor Q14.

Description will be made regarding the operation of the light source module 100C shown in FIG. 10.

Low-Beam Mode

When the turn-on instruction is set to the first state (high-impedance state or high level), the transistor Q12 is turned off, thereby setting the base of the transistor Q13 to the low level. In this state, the transistor Q13 is turned off, and the bypass transistor Q14 is turned on. Accordingly, the driving current $I_{OUT}$ is not supplied to the second light source 120.

Also, when the turn-on instruction H/L is set to the first state, the transistor Q12 is turned off. In this state, the base of the transistor Q1 is set to the low level, thereby turning off the transistor Q11. Accordingly, the voltage $V_{ADIM}$ at the dimming terminal DIM of the driving circuit 132 is set to the reference voltage $V_{REF}$. In this stage, the driving current $I_{OUT}$ is stabilized to a target amount $I_{OUTL}$ that is proportional to the reference voltage $V_{REF}$.

$$I_{OUTL}=K \times V_{ADIM}=K \times V_{REF}$$

High-Beam Mode

When the turn-on instruction H/L is set to the second state (low level), the transistor Q12 is turned on. In this state, a current is supplied to the base of the transistor Q13, thereby turning on the transistor Q13. This turns off the bypass transistor Q14. In this state, the driving current $I_{OUT}$ is supplied to the second light source 120.

Also, when the turn-on instruction H/L is set to the second state (low level), the transistor Q12 is turned on. In this state, a current is supplied to the base of the transistor Q11, thereby turning on the transistor Q11. In this state, the divided reference voltage $V_{REF}$ is supplied to the dimming terminal DIM of the driving circuit 132 as the dimming voltage $V_{ADIM}$.

$$V_{ADIM}=R12/(R11+R12) \times V_{REF}$$

In this stage, the target amount $I_{OUTH}$ of the driving current $I_{OUT}$ is represented by the following Expression.

$$I_{OUTH}=K \times V_{ADIM}=K \times R12/(R11+R12) \times V_{REF}=R12/(R11+R12) \times I_{OUTL}$$

That is to say, the dimming ratio can be set according to the voltage dividing ratio of the resistors R11 and R12.

Figure 11:
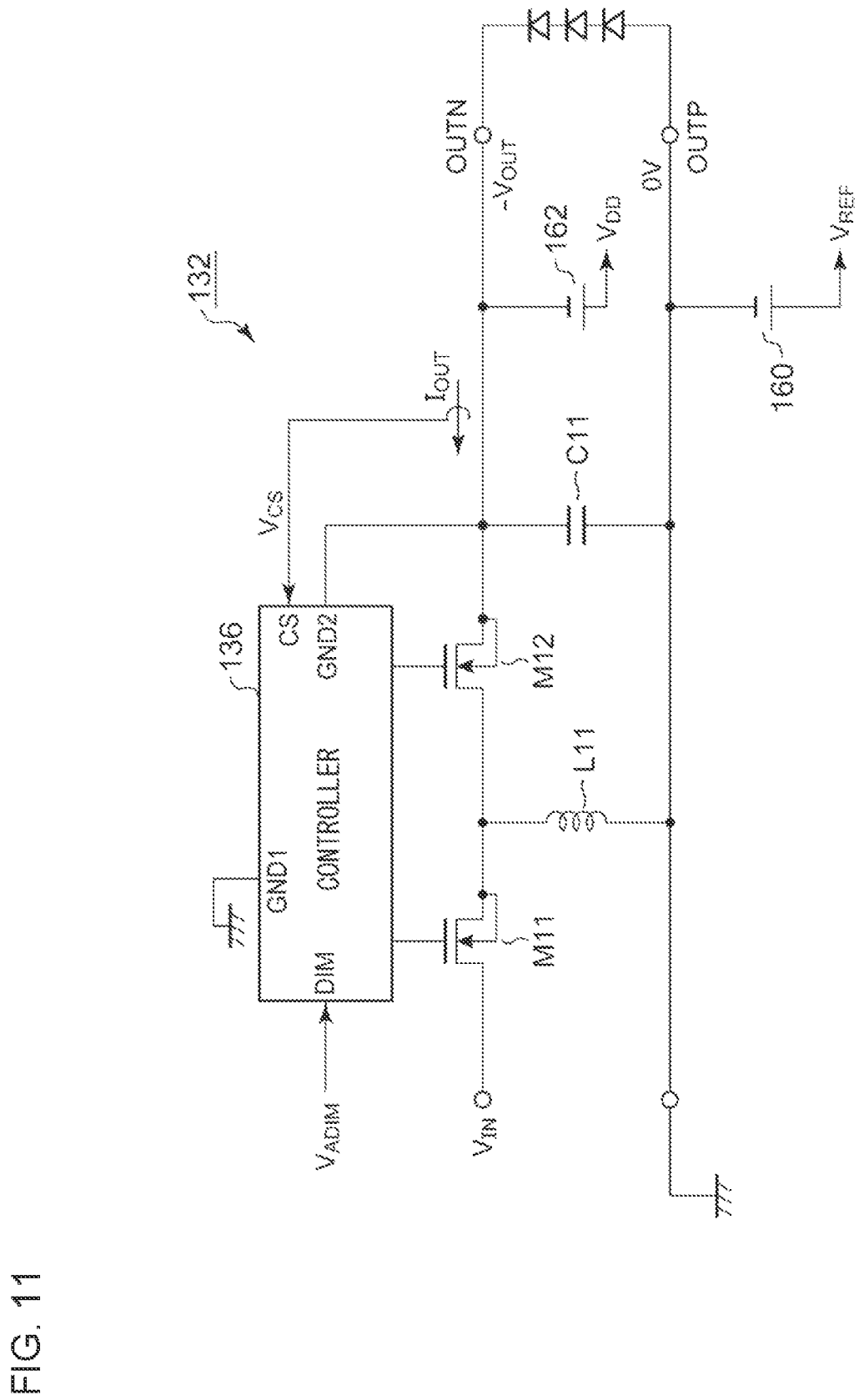
FIG. 11 is a circuit diagram showing an example configuration of a driving circuit.

FIG. 11 is a circuit diagram showing an example configuration of the driving circuit 132. The driving circuit 132 is configured as a polarity-inverting converter that outputs the ground voltage 0 V via its positive electrode output OUTP and a negative voltage $-V_{OUT}$ via its negative electrode output OUTN.

The driving circuit 132 includes transistors M11 and M12, an inductor L11, a capacitor C11, and a controller 136. The controller 136 drives the transistors M11 and M12 such that the current detection signal VCS that corresponds to the driving current $I_{OUT}$ approaches a target value that corresponds to the analog dimming voltage $V_{ADIM}$ input to the dimming terminal DIM. The control method and the control mode of the controller 136 are not restricted in particular. A current-mode control method may be employed. Also, a ripple control method using the current detection signal VCS as a target may be employed. Examples of the ripple control method include a hysteresis control (Bang-Bang control) method, bottom detection method, peak detection method, etc.

It should be noted that the transistors M11 and M12 may be integrated on the same chip as that of the controller 136. Furthermore, the driving circuit 132 includes a reference voltage source 160 and a power supply circuit 162. The reference voltage source 160 generates the reference voltage $V_{REF}$ with the ground voltage as a reference. The power supply circuit 162 generates the power supply voltage $V_{DD}$ with the negative electrode output ($-V_{OUT}$) as a reference. At least one from among the reference voltage source 160 and the power supply circuit 162 may be built into the controller 136.

It should be noted that the configuration of the driving circuit 132 is not restricted to such a polarity-inverting converter, but may also be configured using a boost converter or a step-up/step-down converter. It should be noted that the driving circuit shown in FIG. 11 is applicable to the embodiments 1 and 3.

Figure 12:
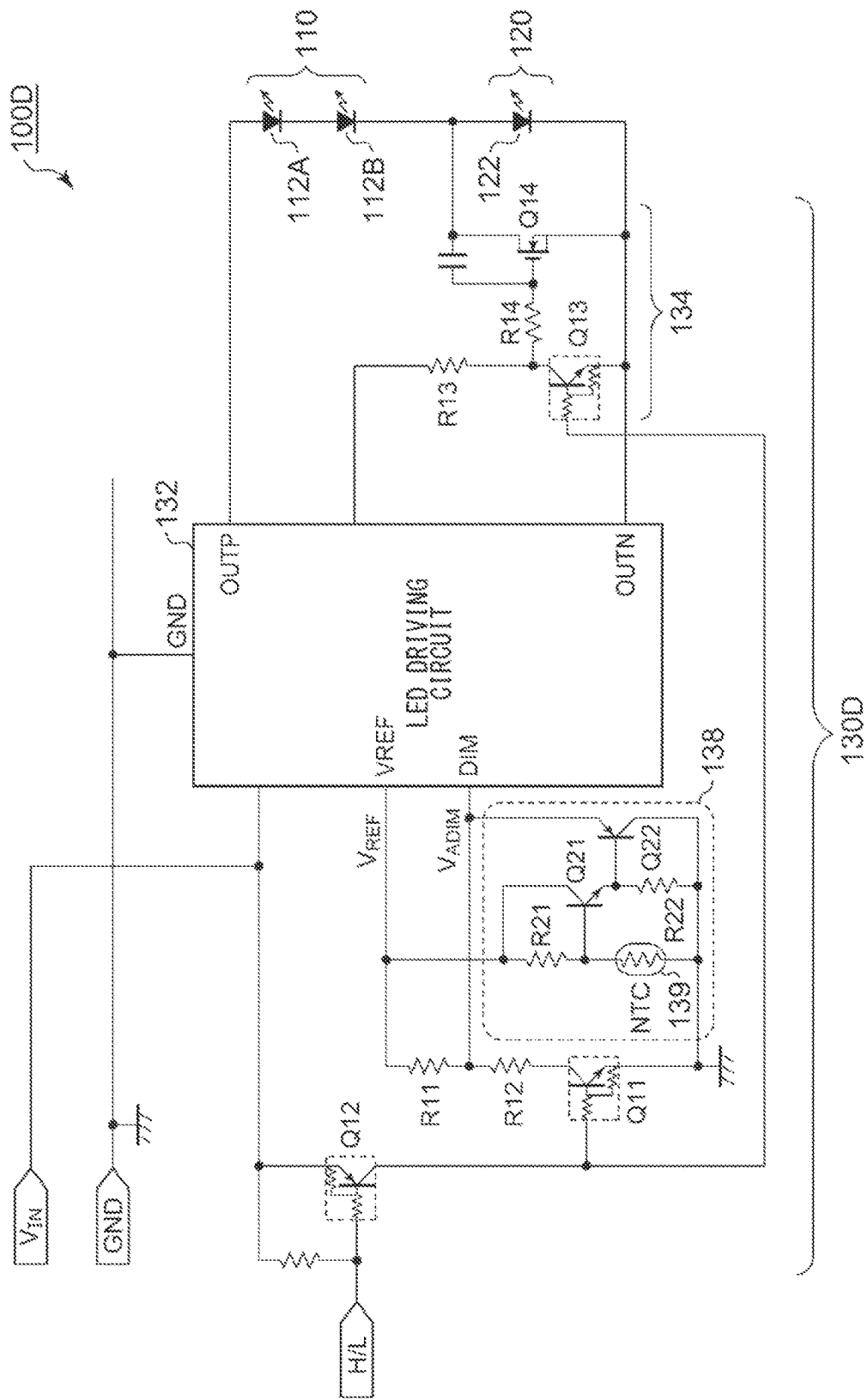
FIG. 12 is a circuit diagram showing a light source module according to a modification.

FIG. 12 is a circuit diagram showing a light source module 100D according to a modification. A lighting circuit 130D includes a temperature derating circuit 138 in addition to the lighting circuit 130C shown in FIG. 10. The temperature derating circuit 138 includes a Negative Temperature Coefficient (NTC) thermistor 139, resistors R21 and R22, and transistors Q21 and Q22.

The resistor R21 and the thermistor 139 divide the reference voltage $V_{REF}$ so as to generate a temperature detection voltage $V_{TEMP}$ that is reduced according to an increase of the temperature. The voltage $V_{ADIM}$ at the dimming terminal DIM is clamped by the transistor Q21, the resistor R22, and the transistor Q22 such that it does not exceed the temperature detection voltage $V_{TEMP}$. As the temperature becomes higher, the temperature detection voltage $V_{TEMP}$ becomes lower. This lowers the voltage $V_{ADIM}$ at the dimming terminal DIM, thereby reducing the driving current $I_{OUT}$. This provides temperature derating.

Figure 13:
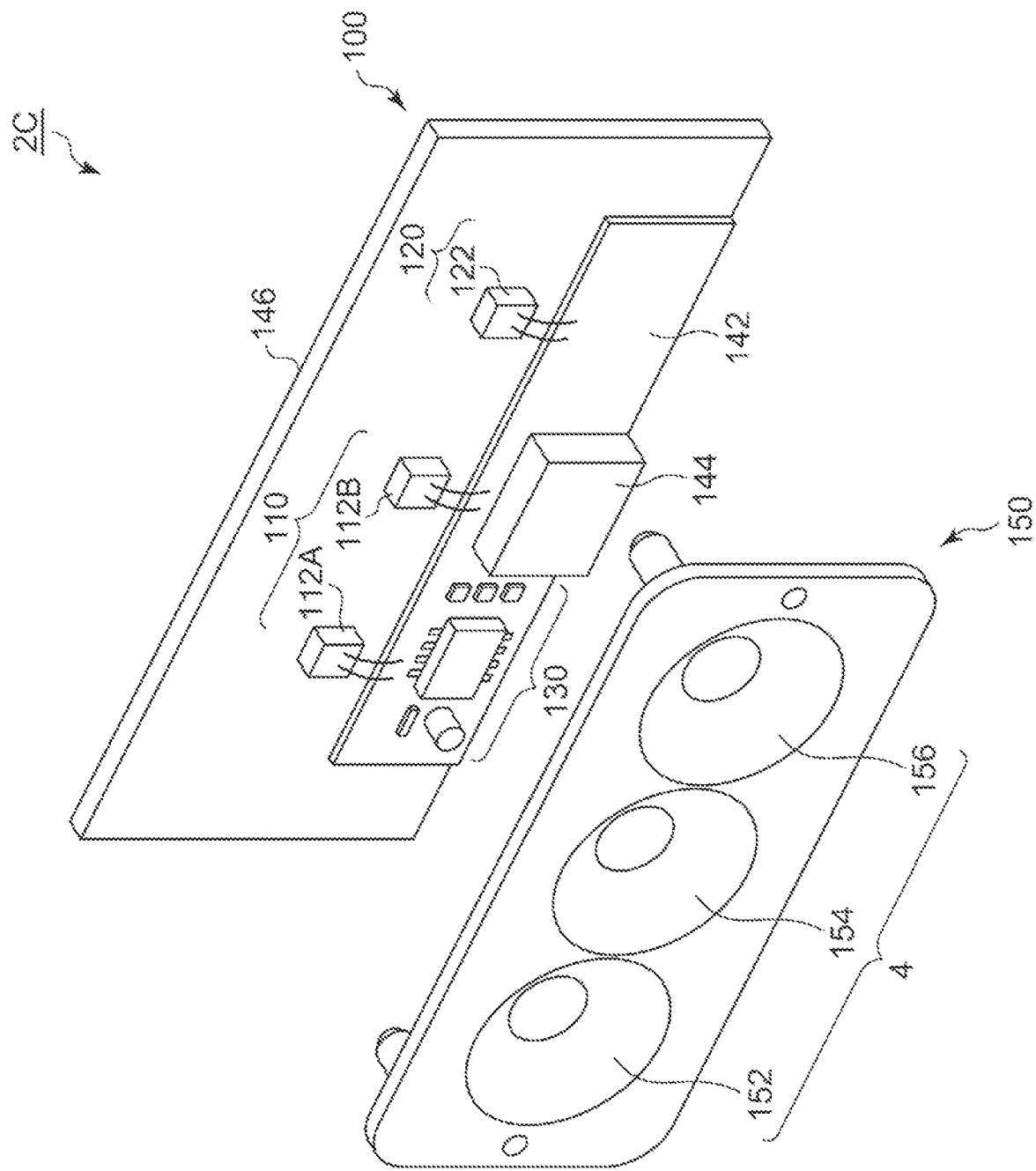
FIG. 13 is a perspective diagram showing an example of the layout of the headlamp shown in FIG. 6.

FIG. 13 is a perspective diagram showing an example of the layout of the headlamp 2C shown in FIG. 6. The headlamp 2C has the same basic configuration as that shown in FIG. 4. Accordingly, description will be made regarding only the points of difference. As described above, with the headlamp 2C according to the embodiment 2, this allows the power consumption in the high-beam mode to be reduced. This allows the first light source 110 and the second light source 120 to have a simplified cooling structure. Accordingly, in the example shown in FIG. 13, the heatsink 140 shown in FIG. 6 is replaced by a thin radiator plate 146 as shown in FIG. 13. This allows the light source module 100 to have a compact size. Furthermore, this allows the cost to be reduced.

Embodiment 3

Figure 14:
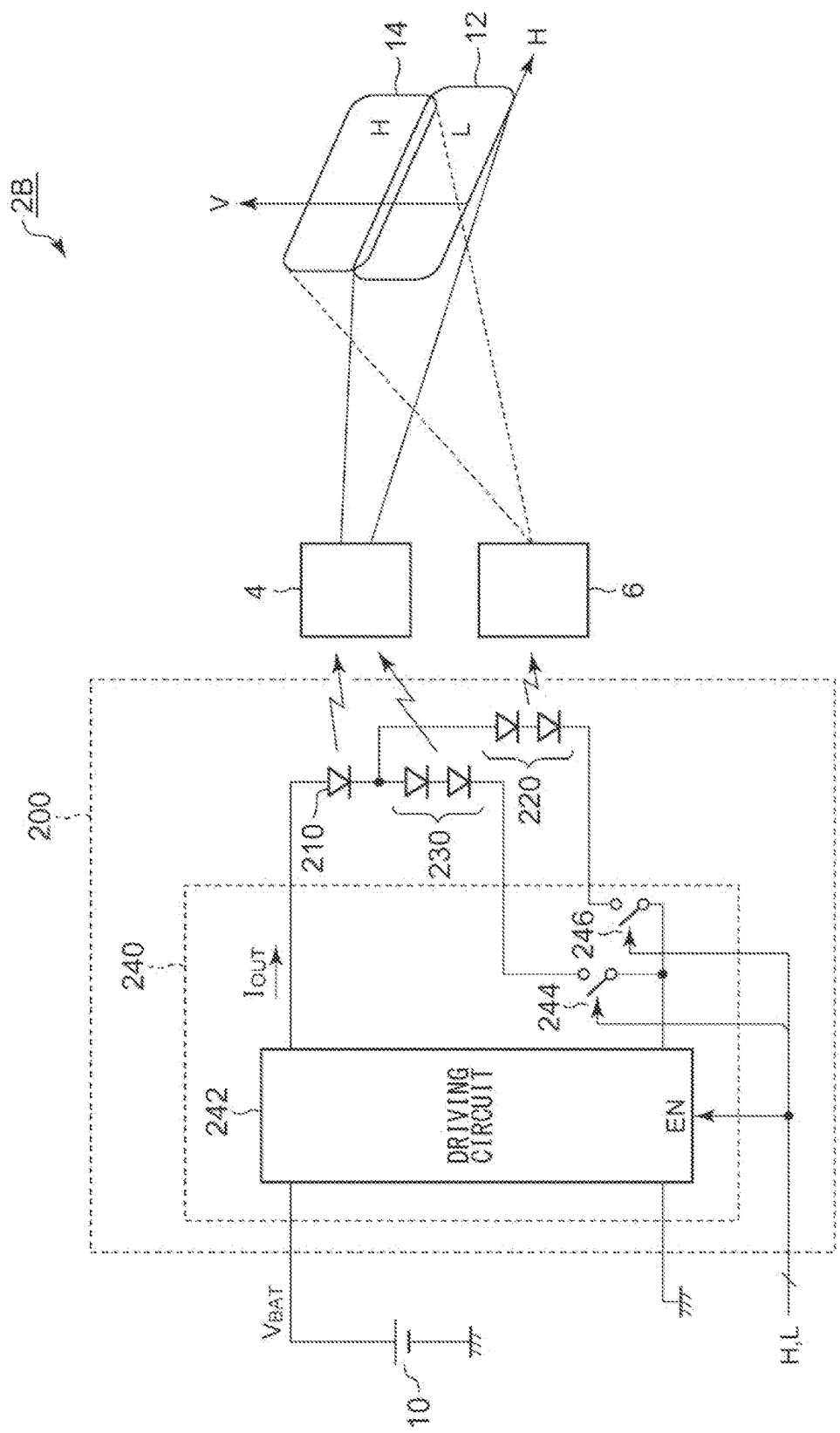
FIG. 14 is a diagram showing a headlamp provided with a light source module according to an embodiment 3.

FIG. 14 is a diagram showing a headlamp 2B provided with a light source module 200 according to an embodiment 3. As in the embodiment 1, the headlamp 2B is mounted on a motorcycle, and is switchable between the high beam and the low beam. The headlamp 2B includes the light source module 200, the first optical system 4, the second optical system 6, and an unshown heatsink.

The light source module 200 includes a first light source 210, a second light source 220, a third light source 230, and a lighting circuit 240, in the form of a module. The first light source 210 and the third light source 230 are arranged such that the output light of each light source is irradiated by the first optical system 4 to the low-beam region 12 on a virtual vertical screen. The second light source 220 is arranged such that its output light is irradiated to the high-beam region 14 by the second optical system 6.

The first light source 210, the second light source 220, and the third light source 230 each include at least one semiconductor light-emitting element, examples of which include a light-emitting diode (LED), laser diode (LD), and an organic EL element. For the same reason as in the embodiment 1, the number of LEDs coupled in series is three. This allows the driving circuit 242 to be configured as a step-down converter or a linear regular.

The light source module 200 receives a turn-on instruction for the high beam and the low beam to be input from the vehicle side. The lighting circuit 240 supplies the driving current $I_{OUT}$ to the first light source 210 regardless of whether the turn-on instruction is for the high beam or the low beam. Furthermore, the lighting circuit 240 is configured to supply the driving current $I_{OUT}$ to the second light source 220 in response to the turn-on instruction for the high beam. Moreover, the lighting circuit 240 is configured to supply the driving current $I_{OUT}$ to the third light source 230 in response to the turn-on instruction for the low beam.

In the embodiment, the lighting circuit 240 includes a driving circuit 242 configured as a constant current driver, a first switch 244, and a second switch 246. In the turn-on state of the high beam or the low beam, the driving circuit 242 is enabled. In this state, the driving circuit 242 generates the driving current $I_{OUT}$.

The first switch 244 is arranged in series with the third light source 230. The second switch 246 is arranged in series with the second light source 220. The first switch 244 is turned on in response to the turn-on instruction for the low beam. The second switch 246 is turned on in response to the turn-on instruction for the high beam.

The above is the configuration of the light source module 200. Next, description will be made regarding the operation thereof.

In a state in which neither the high beam turn-on instruction nor the low beam turn-on instruction occurs, the driving circuit 242 is set to the disable state. In this state, the driving current $I_{OUT}$ is not generated.

If either the high beam turn-on instruction or the low beam turn-on instruction occurs, the driving circuit 242 is enabled. In this state, the driving current $I_{OUT}$ stabilized to a predetermined amount of current is generated.

During a period in which the low beam turn-on instruction occurs, the first switch 244 is turned on, and the second switch 246 is turned off. In this state, the driving current $I_{OUT}$ flows through a path of the first light source 210, the third light source 230, and the first switch 244. Accordingly, the first light source 210 and the third light source 230 are turned on, and the second light source 220 is turned off, thereby illuminating the low-beam region 12.

During a period in which the high beam turn-on instruction occurs, the first switch 244 is turned off, and the second switch 246 is turned on. In this state, the driving current $I_{OUT}$ flows through a path of the first light source 210, the second light source 220, and the second switch 246. Accordingly, the first light source 210 and the second light source 220 are turned on, and the third light source 230 is turned off. In this state, the high-beam region 14 is illuminated. Furthermore, the low-beam region 12 is illuminated with a light intensity that is lower than that in the low-beam mode.

Figure 15:
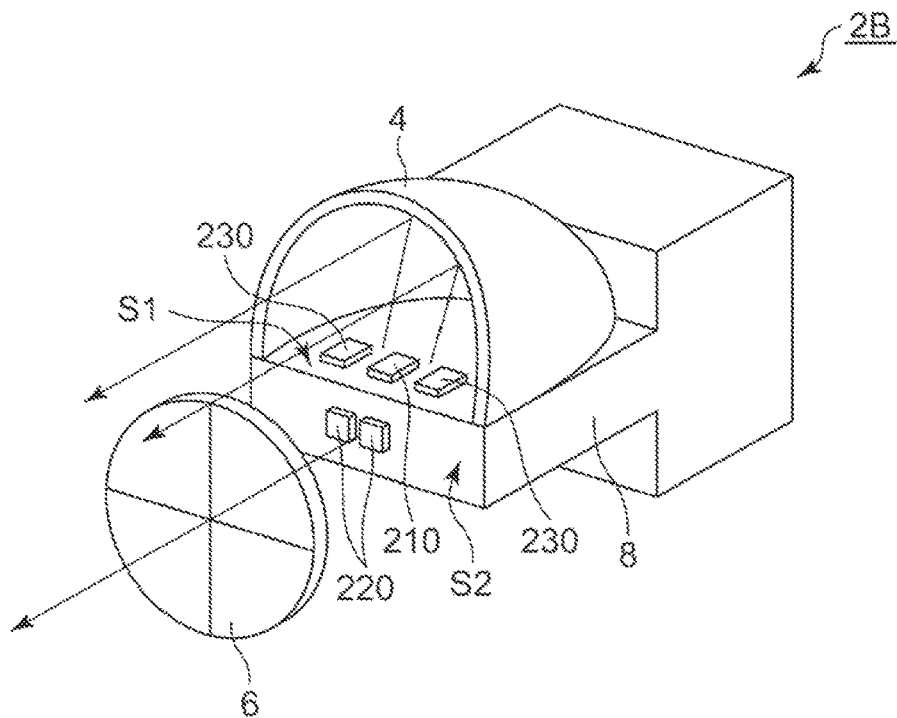
FIG. 15 is a perspective diagram showing an example of the layout of the headlamp.

FIG. 15 is a perspective diagram showing an example of the layout of the headlamp 2B. The first light source 210 and the third light source 230 are mounted on the first face S1 which is parallel to the ground. The second light source 220 is mounted on the second face S2 which is orthogonal to the ground. The first face S1 and the second face S2 correspond to the surface of the block-shaped heatsink 8.

Preferably, the three light-emitting elements that form the first light source 210 and the third light source 230 are arranged side-by-side in the horizontal direction. This allows a cut line, which is the boundary between the high beam and the low beam, to be easily formed in the horizontal direction. For example, the light-emitting element of the first light source 210 may be arranged in the center. Also, the two light-emitting elements that form the third light source 230 may be arranged such that the light-emitting element of the first light source 210 is interposed between them.

The first optical system 4 includes a reflective optical system, i.e., a mirror. The second optical system 6 includes a transmissive optical system, i.e., a lens.

Figure 16:
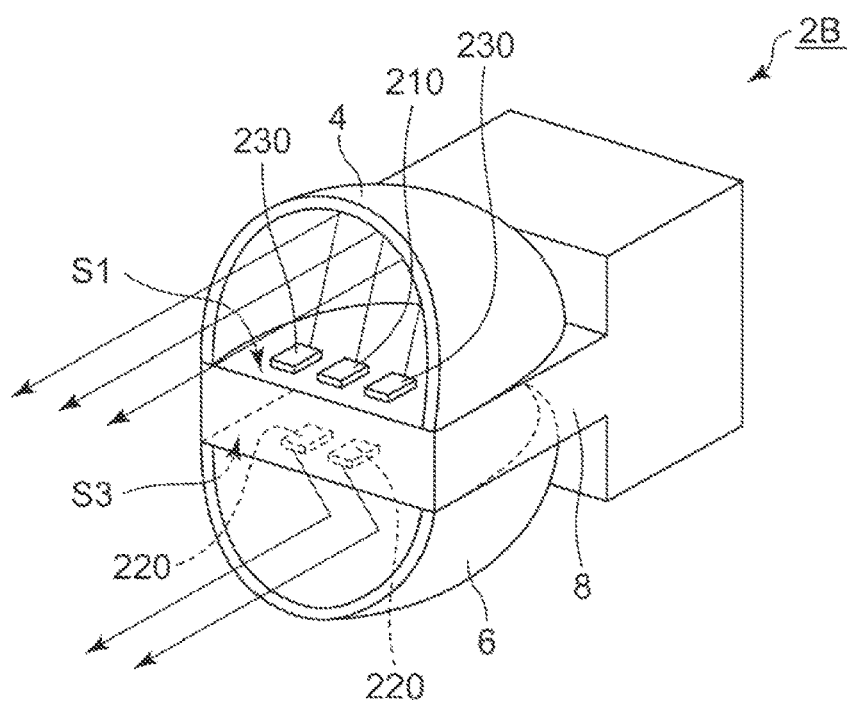
FIG. 16 is a perspective diagram showing another example of the layout of the headlamp and the light source module.

FIG. 16 is a perspective diagram showing another example of the layout of the headlamp 2B and the light source module 200. The first light source 210 and the third light source 230 are mounted on the first face S1 which is parallel to the ground. The second light source 220 is mounted on the third face S3 which is opposite to the first face S1. The first optical system 4 includes a first reflector provided on the first face S1 side. The second optical system 6 includes a second reflector provided on the third face side.

In the example shown in FIG. 16, three light-emitting elements that form the first light source 210 and the third light source 230 are also arranged side-by-side in the horizontal direction. Similarly, two light-emitting elements that form the second light source 22 are arranged side-by-side in the horizontal direction. This allows a cut line, which is a boundary between the high beam and the low beam, to be easily formed.

It should be noted that description has been made above regarding a lamp for a motorcycle. However, the present invention is not restricted to such an application. Also, the present invention is applicable to various kinds of vehicles such as automobiles, trucks, etc.

Figure 17:
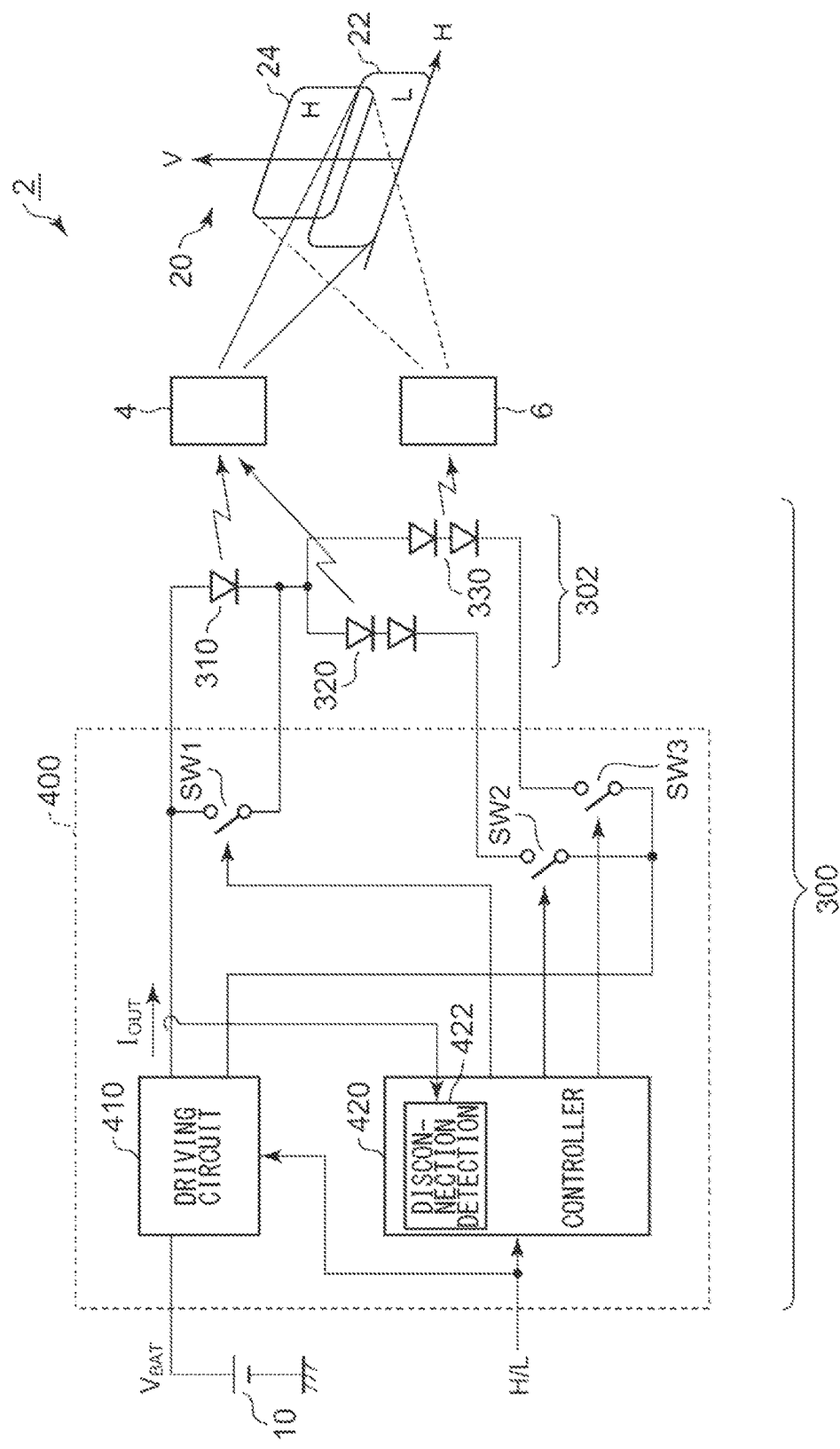
FIG. 17 is a diagram showing a headlamp for a motorcycle according to an embodiment 4.

FIG. 17 is a diagram showing a headlamp 2 for a motorcycle according to an embodiment 4. The headlamp 2 is switchable between the high beam and the low beam. The headlamp 2 includes a light source module 300, a first optical system 4, and a second optical system 6.

The light source module 300 includes an LED string 302 and a lighting circuit 400 in the form of a module. The LED string 302 includes a first light source 310 and a second light source 320 configured as a low-beam light source and a third light source 330 configured as a high-beam light source. The output light of the first light source 310 and the second light source 320 is irradiated to a low-beam region 22 on a virtual vertical screen 20 by the first optical system 4. The output light of the third light source 330 is irradiated to a high-beam region 24 by the second optical system 6.

The first light source 310, the second light source 320, and the third light source 330 each include at least one semiconductor light-emitting element, e.g., a light-emitting diode (LED). It should be noted that, as such a semiconductor light-emitting element, a laser diode (LD) or an organic EL element may be employed.

In the embodiment, the first light source 310 includes a single LED. The second light source 320 and the third light source 330 each include two LEDs. Accordingly, a total of three LEDs are arranged in series on each driving path of the driving circuit 410. Typically, the voltage $V_{BAT}$ of a battery 10 mounted on a motorcycle, i.e., the power supply voltage of the driving circuit 410, is 12 V. In contrast, a white LED has a forward voltage on the order of 3.5 V. Accordingly, the voltage across both ends of a load of the driving circuit 410 is on the order of 10.5 V (=3.5 V×3), which is lower than the battery voltage $V_{BAT}$. Accordingly, the driving circuit 410 can be configured as a step-down switching converter or a linear regulator.

The light source module 300 receives the input of a high beam turn-on instruction and a low beam turn-on instruction from the vehicle side in addition to the battery voltage $V_{BAT}$. The lighting circuit 400 controls the path of the driving current $I_{OUT}$ according to the high beam turn-on instruction and the low beam turn-on instruction, so as to control the turn-on/turn-off of the first light source 310, the second light source 320, and the third light source 330.

The lighting circuit 400 includes a driving circuit 410, a first switch SW1, a second switch SW2, a third switch SW3, and a controller 420.

The first switch SW1 is arranged in parallel with the first light source 310. The second light source 320 and the second switch SW2 are coupled in series. The third light source 330 and the third switch SW3 are arranged in series so as to form a path parallel to the second light source 320 and the second switch SW2.

The driving circuit 410 is configured as a constant current output driver. The driving circuit 410 is set to the enable state in response to either the high beam turn-on instruction or the low beam turn-on instruction. In the enable state, the driving circuit 410 generates the driving current $I_{OUT}$ stabilized to a predetermined amount of current.

The controller 420 controls the on/off of each of the first switch SW1 through the third switch SW3 according to the presence or absence of the high beam turn-on instruction, the low beam turn-on instruction, and the occurrence of a current disconnection.

The controller 420 is configured to be capable of detecting the occurrence of a current disconnection due to the occurrence of a disconnection in the LED string including the first light source 310, the second light source 320, and the third light source 330. For example, the controller 420 monitors the output current $I_{OUT}$ of the driving circuit 410. When a predetermined amount of the driving current $I_{OUT}$ does not flow in the enable state of the driving circuit 410, the controller 420 judges that a current cutoff state has occurred. Conversely, a state in which the occurrence of a current disconnection is not detected will be referred to as a "normal state".

For example, when the state in which a predetermined amount of the driving current $I_{OUT}$ does not flow continues for a predetermined second time T2 in the enable state of the driving circuit 410, the controller 420 judges that a current cutoff state has occurred. The second time T2 may preferably be set in a range between 2 ms through 500 ms. With such an arrangement in which the second time T2 is set to be longer than 2 ms, this is capable of preventing false detection of a current cutoff state due to noise. Furthermore, with such an arrangement in which the second time T2 is set to be shorter than 500 ms, this allows a current cutoff state to be detected in a short period of time. Moreover, in a case in which the headlamp is returned to the turn-on state using processing described below, this allows the turn-off time of the headlamp to be suppressed to 500 ms or less, thereby securing safety.

In the normal state, the controller 420 fixedly turns off the first switch SW1. Furthermore, in the normal state, (i) the controller 420 turns on the second switch SW2 and turns off the third switch SW3 in response to the low beam turn-on instruction. In this state, the driving current $I_{OUT}$ generated by the driving circuit 410 flows through a path including the first light source 310, the second light source 320, and the second switch SW2. In this stage, the first light source 310 and the second light source 320 are turned on, thereby illuminating the low-beam region 22.

In the normal state, (ii) the controller 420 turns off the second switch SW2 and turns on the third switch SW3 in response to the high beam turn-on instruction. In this state, the driving current $I_{OUT}$ generated by the driving circuit 410 flows through the path including the first light source 310, the third light source 330, and the third switch SW3. In this stage, the first light source 310 and the third light source 330 are turned on, thereby illuminating the high-beam region 24, and illuminating the low-beam region 22 with a light intensity that is lower than that in the low-beam mode.

Next, description will be made regarding a control operation when a malfunction occurs due to a disconnection.

Upon detecting the current cutoff state, the controller 420 sets the first switch SW1 to the on state. When a disconnection has occurred in the first light source 310 from among the components of the LED string 302, the first switch SW1 is turned on. With this, the driving current $I_{OUT}$ flows again, thereby resolving the current cutoff state. Accordingly, the driving current $I_{OUT}$ is biased via the first switch SW1, thereby allowing the driving current $I_{OUT}$ to be continuously supplied to the second light source 320 or the third light source 330, thereby allowing continuous illumination in front of the vehicle.

Description will be made regarding a case in which a disconnection has occurred in a portion of the LED string 302 other than the first light source 310. In this case, the driving current $I_{OUT}$ does not flow even after the first switch SW1 is turned on. That is to say, the current cutoff state continues. Accordingly, when the current cutoff state continues over the predetermined first time T1 after the first switch SW1 is turned on, the controller 420 judges that the disconnection has occurred in a portion other than the first light source 310. In this case, the controller 420 turns off the first switch SW1.

Figure 18:
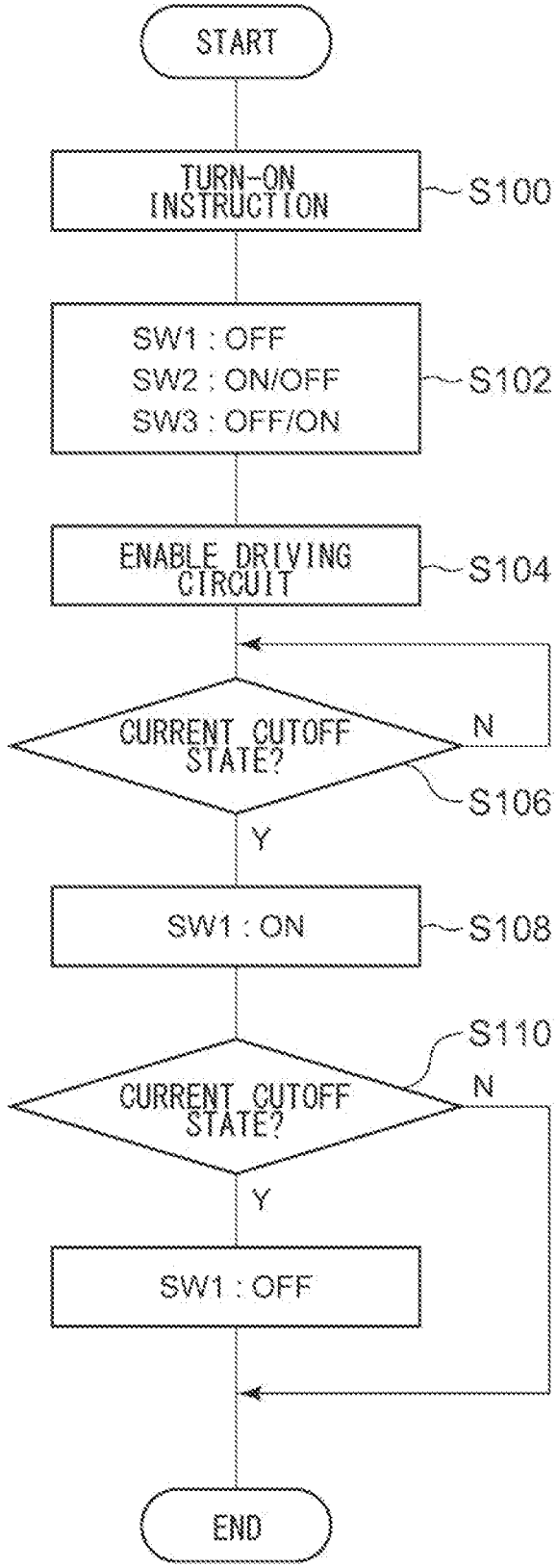
FIG. 18 is a flowchart for explaining the operation of the light source module.

FIG. 18 is a flowchart for explaining the operation of the light source module 300. When either the low beam turn-on instruction or the high beam turn-on instruction occurs (S100), the first switch SW1 through the third switch SW3 are each set to a state that corresponds to the turn-on instruction (S102). Specifically, the first switch SW1 is turned off. When the low beam turn-on instruction occurs, the second switch SW2 is turned on, and the third switch SW3 is turned off. When the high beam turn-on instruction occurs, the second switch SW2 is turned off, and the third switch SW3 is turned on. In this state, the driving circuit 410 is enabled so as to generate the driving current $I_{OUT}$ (S104).

The controller 420 monitors the presence or absence of a current disconnection (S106). During the normal state (NO in S106), the low beam turn-on state is maintained. Upon detecting a current disconnection (YES in S106), the first switch SW1 is turned on (S108). Subsequently, the presence or absence of a current disconnection is judged again (S110). When the current disconnection is resolved (NO in S110), the turn-on state of the first switch SW1 is maintained. When the current disconnection is not resolved (YES in S110), the first switch SW1 is turned off.

Figure 19:
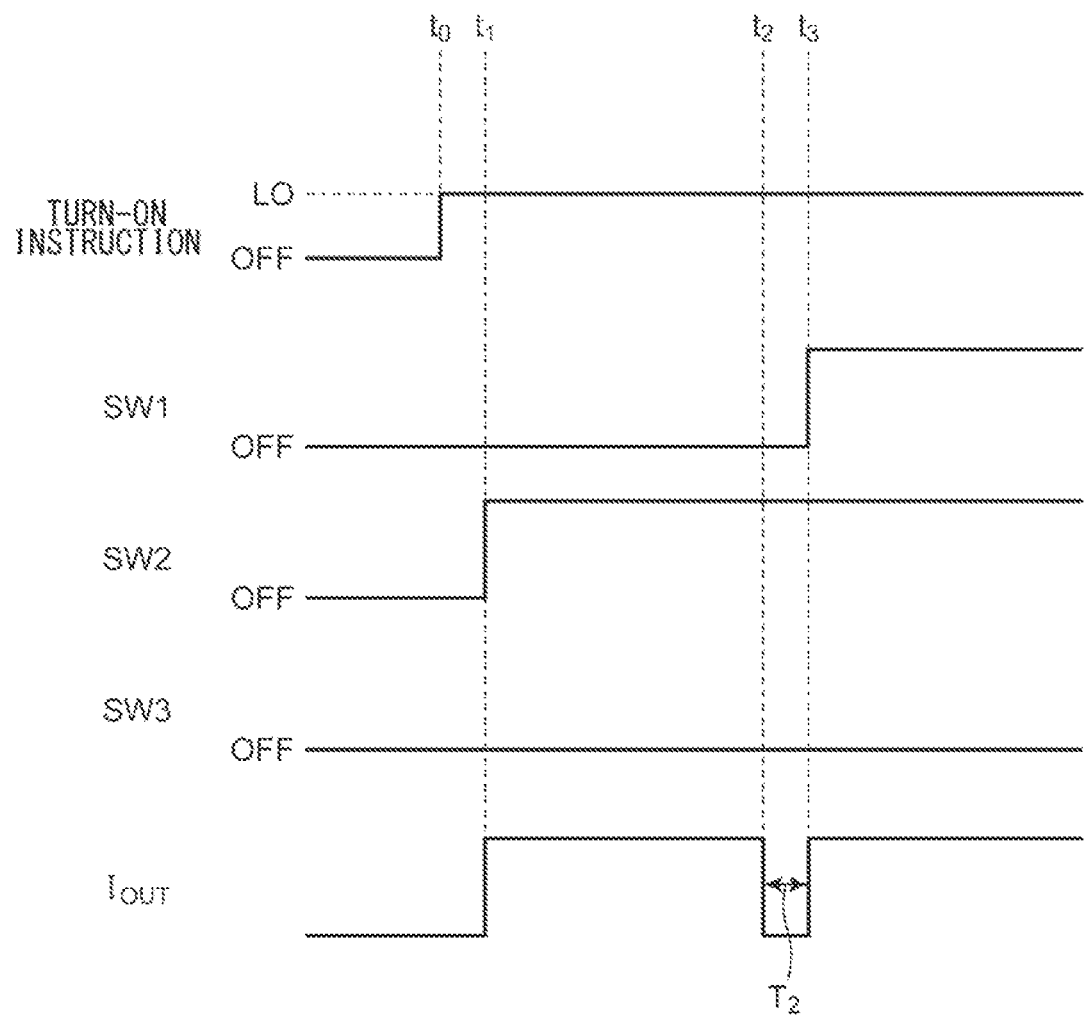
FIG. 19 is a first operation waveform diagram showing the operation of the light source module.

FIG. 19 is an operation waveform diagram of the light source module 300. FIG. 19 shows a situation in which a disconnection malfunction occurs in the first light source 310 in the low beam turn-on state. Before the time point $t_2$, the light source module 300 is in the normal state. At the time point $t_0$, the low beam turn-on instruction occurs. At the time point $t_1$, the second switch SW2 is turned on, and the driving current 410 generates the driving current $I_{OUT}$.

When a disconnection malfunction occurs in the first light source 310 at the time point $t_2$, the driving current $I_{OUT}$ is cut off. When this state continues for the second time T2, judgment is made at the time point $t_3$ that a current cutoff state has occurred, and the first switch SW1 is turned on. After the first switch SW1 is turned on, the disconnection portion is bypassed. Accordingly, the driving current $I_{OUT}$ starts to flow again, thereby maintaining the turn-on state of the low beam. It should be noted that the low beam is irradiated with an intensity that is lower than that in the normal state.

Figure 20:
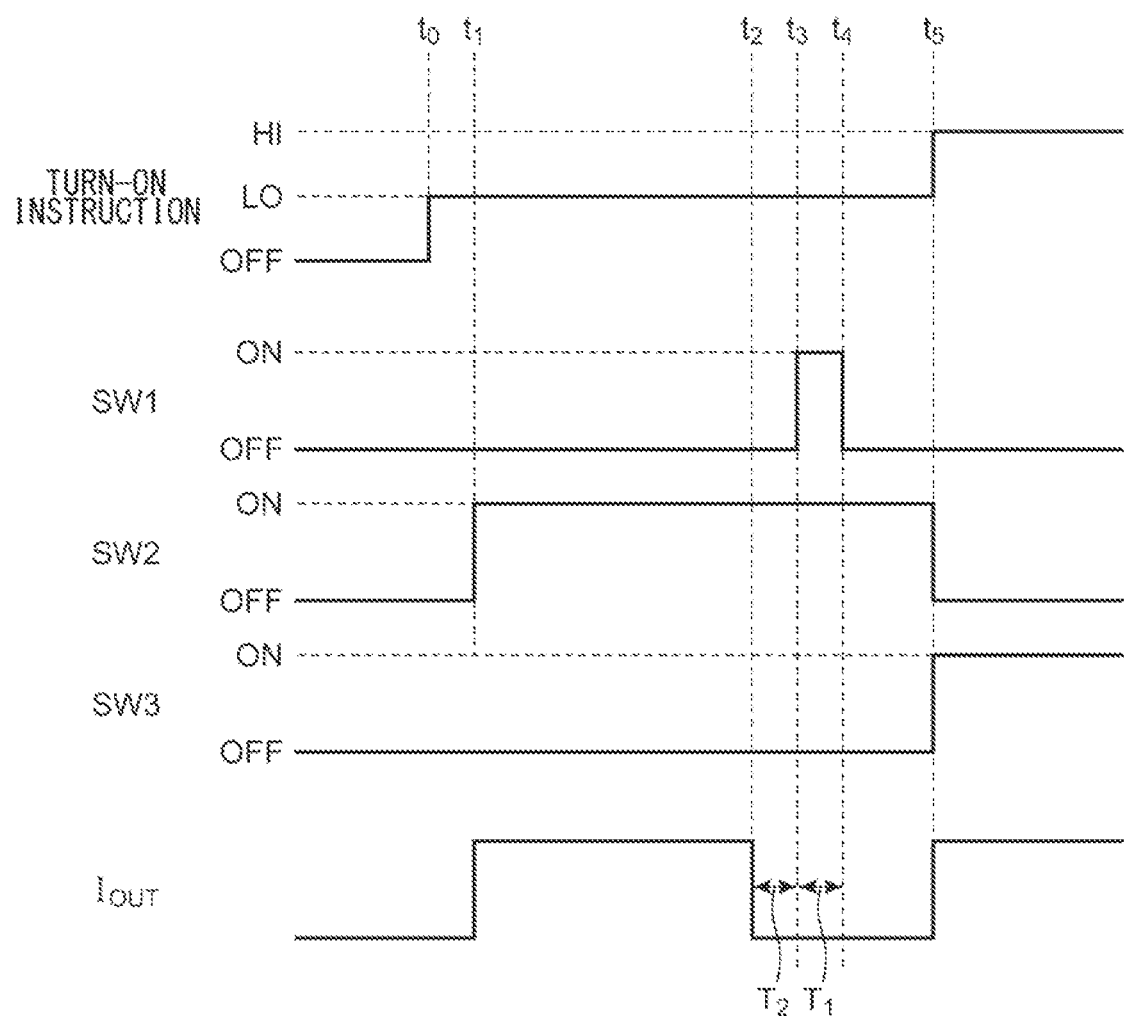
FIG. 20 is a second operation waveform diagram showing the operation of the light source module.

FIG. 20 is a second operation waveform diagram showing the operation of the light source module 300. FIG. 20 shows a situation when a disconnection malfunction occurs in the second light source 320 in the low beam turn-on state. The operation from the time point $t_0$ to the time point $t_2$ is the same as that shown in FIG. 19.

When a disconnection malfunction has occurred in the second light source 320 at the time point $t_2$, the driving current $I_{OUT}$ is cut off. When this state continues for the second time T2, judgment is made at the time point $t_3$ that a current cutoff state has occurred, and the first switch SW1 is turned on. However, even after the first switch SW1 is turned on, the disconnection portion is not bypassed. Accordingly, the current cutoff state continues. Subsequently, when the first time T1 elapses after the first switch SW1 is turned on, i.e., at the time point $t_4$, the first switch SW1 is turned off.

When the cutoff state of the driving current $I_{OUT}$ continues, the field of vision becomes dark. This allows the driver to notice the occurrence of an abnormal state in the headlamp 2. When the driver switches the headlamp 2 from the low-beam mode to the high-beam mode at the time point $t_5$, the second switch SW2 is turned off, and the third switch SW3 is turned on. In this state, the disconnection portion is not used. Accordingly, the driving current $I_{OUT}$ starts to flow again, thereby allowing the headlamp 2 to be used as a high-beam lamp.

Figure 21:
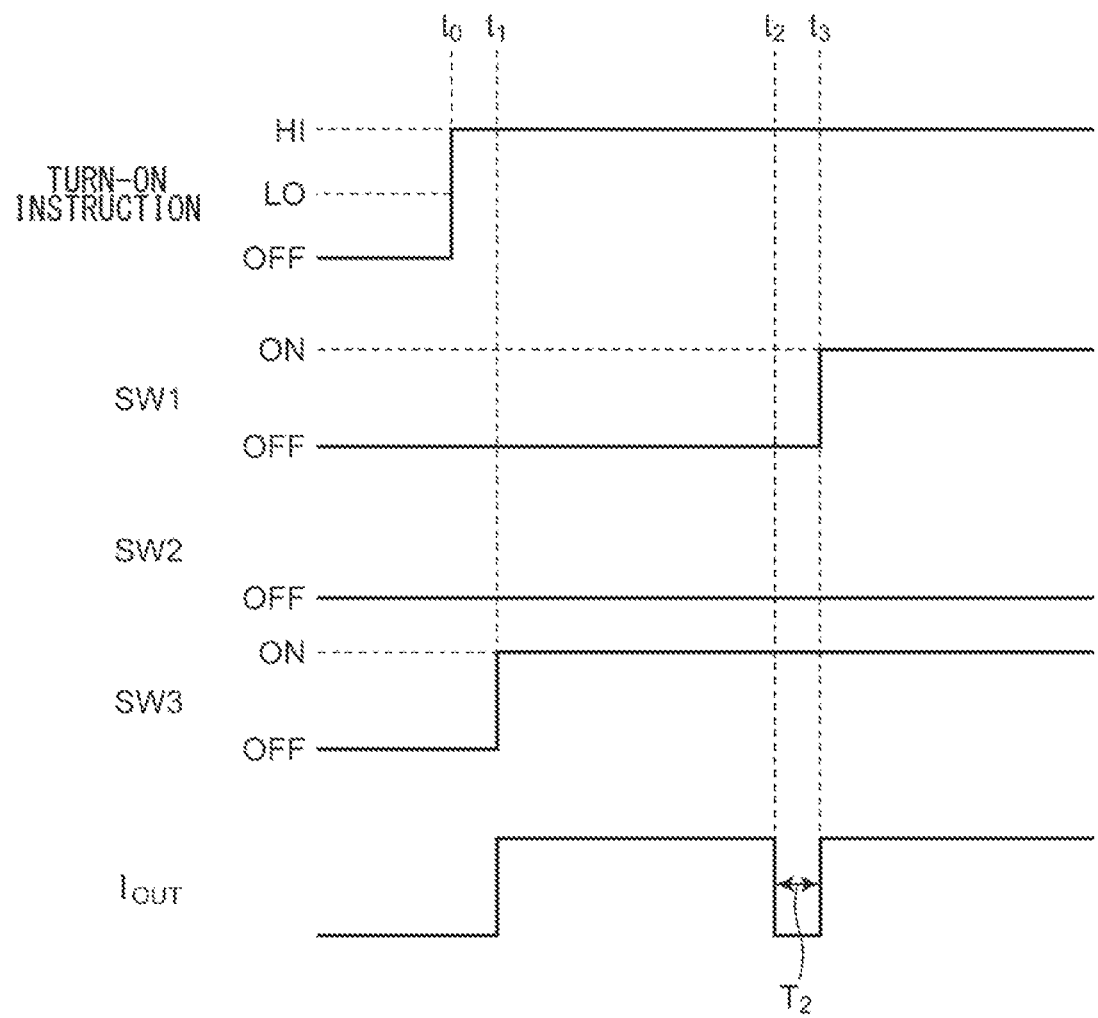
FIG. 21 is a third operation waveform diagram showing the operation of the light source module.

FIG. 21 is a third operation waveform diagram showing the operation of the light source module 300. FIG. 21 shows a situation in which a disconnection malfunction occurs in the first light source 310 in the high beam turn-on state. Before the time point $t_2$, the light source module 300 operates normally. At the time point $t_0$, the high beam turn-on instruction occurs. At the time point $t_1$, the third switch SW3 is turned on, and the driving current 410 generates the driving current $I_{OUT}$.

When a disconnection malfunction has occurred in the first light source 310 at the time point $t_2$, the driving current $I_{OUT}$ is cut off. When this state continues for the second time T2, judgment is made at the time point $t_3$ that a current cutoff state has occurred, and the first switch SW1 is turned on. After the first switch SW1 is turned on, the disconnection portion is bypassed. Accordingly, the driving current $I_{OUT}$ starts to flow again, thereby maintaining the turn-on state of the high beam. It should be noted that the first light source 310 is turned off. Accordingly, no light is irradiated to the low-beam region.

Figure 22:
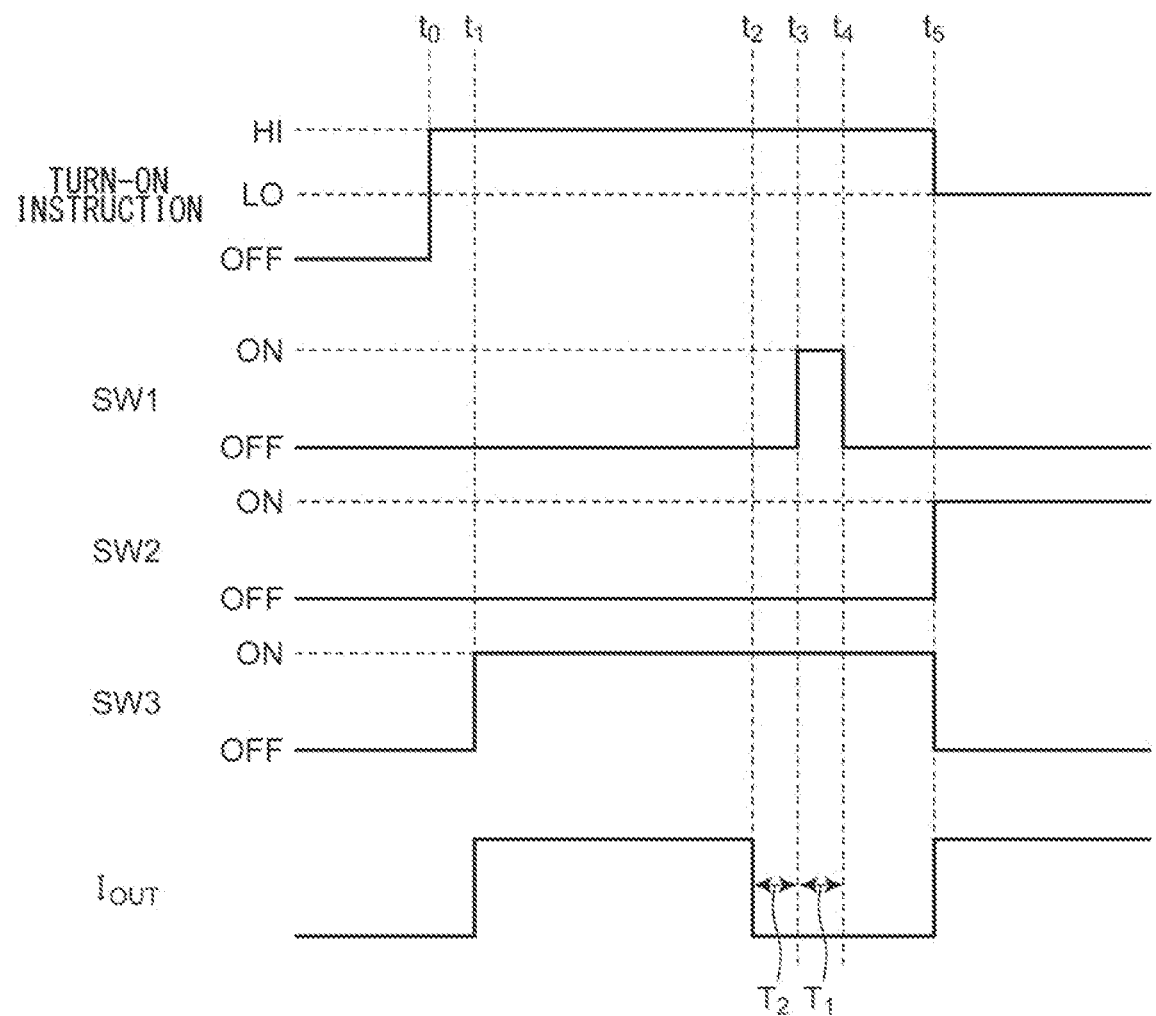
FIG. 22 is a fourth operation waveform diagram showing the operation of the light source module.

FIG. 22 is a fourth operation waveform diagram showing the operation of the light source module 300. FIG. 22 shows a situation in which a disconnection malfunction occurs in the third light source 330 in the high beam turn-on state. The operation from the time point $t_0$ to the time point $t_2$ is the same as that shown in FIG. 21.

When a disconnection malfunction occurs in the light source module 330 at the time point $t_2$, the driving current $I_{OUT}$ is cut off. When this state continues for the second time T2, judgement is made at the time point $t_3$ that a current cutoff state has occurred, and the first switch SW1 is turned on. However, even after the first switch SW1 is turned on, the disconnection portion is not bypassed. Accordingly, the current cutoff state continues. Subsequently, when the first time T1 elapses after the first switch SW1 is turned on, i.e., at the time point $t_4$, the first switch SW1 is turned off.

When the cutoff state of the driving current $I_{OUT}$ continues, the field of vision becomes dark. This allows the driver to notice the occurrence of an abnormal state in the headlamp 2. When the driver switches the headlamp 2 from the high-beam mode to the low-beam mode at the time point $t_5$, the third switch SW3 is turned off, and the second switch SW2 is turned on. As a result, the disconnection portion is not used. Accordingly, the driving current $I_{OUT}$ starts to flow again, thereby allowing the headlamp 2 to be continuously used as a low-beam lamp.

Next, description will be made regarding modifications relating to the embodiment 4.

Modification 1

In the control shown in FIGS. 20 and 22, after the driver has noticed the turn-off state of the headlamp 2, the driver manually switches the headlamp 2 from the low-beam mode to the high-beam mode (or from the high-beam mode to the low-beam mode), so as to return the headlamp 2 to the turn-on state. However, the present invention is not restricted to such an arrangement. After the first switch SW1 is turned off after the first switch SW1 is temporarily turned on, the controller 420 may automatically switch the states of the second switch SW2 and the third switch SW3 regardless of the turn-on instruction received from an external circuit. This allows the turn-off period from the time point $t_4$ to the time point $t_5$ shown in FIG. 20 or 22 to be reduced.

With such a control operation, this reduces the turn-off period, thereby providing improved safety. However, this has the potential to cause a problem in that the driver does not notice the occurrence of a disconnection in the LED string 302. This has the potential to cause a problem in that the driver drives the vehicle in a state in which the lamp is not repaired. In this case, the cockpit may be provided with an indicator as an additional component configured to indicate the occurrence of a malfunction in the headlamp 2.

Modification 2

During a period in which the first switch SW1 is fixedly set to the on state, the controller 420 may turn on the second switch SW2 and turn off the third switch SW3 regardless of the turn-on instruction for the high beam turn-on or the low beam.

With the modification 2, this disables manual switching between the high-beam mode and the low-beam mode. This allows the driver to be notified of the occurrence of a disconnection malfunction. Furthermore, the headlamp 2 is fixedly set to the low-beam mode. Such an arrangement is capable of preventing glare from being imparted to traffic participants in the vicinity.

Modification 3

Unlike the modification 2, during a period in which the first switch SW1 is fixedly set to the on state, the controller 430 may turn on the third switch SW3 and turn off the second switch SW2 regardless of the turn-on instruction for the high beam or the low beam.

With the modification 3, this disables manual switching between the high-beam mode and the low-beam mode. This allows the driver to be notified of the occurrence of a disconnection malfunction. Also, in many cases, the vehicle travels in the low-beam mode. Accordingly, with such an arrangement in which only the high beam is enabled and the low beam is disabled, this allows the driver to easily notice the disconnection malfunction.

Modification 4

Description has been made above regarding a lamp for a motorcycle. However, the present invention is not restricted to such an arrangement. Also, the present invention is applicable to other kinds of vehicles such as automobiles, trucks, etc.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

What is claimed is:

1. A light source module for a vehicle structured to be switchable between a high beam and a low beam, the light source module comprising:
    a first light source arranged such that an output light of the first light source is irradiated to a low-beam region by a first optical system;
    a second light source arranged such that an output light of the second light source is irradiated to a high-beam region by a second optical system; and
    a lighting circuit structured to supply a driving current to the first light source in response to any one from among a turn-on instruction for the high beam and a turn-on instruction for the low beam, and to supply the driving current to the second light source in response to the turn-on instruction for the high beam,
    wherein the first light source and the second light source are coupled in series, and wherein the lighting circuit comprises:
        a driving circuit structured to supply the driving current to a series connection circuit of the first light source and the second light source; and
        a bypass switch arranged in parallel with the second light source, and structured to be turned off during a period in which the turn-on instruction for the high beam occurs, and to be turned on during a period in which the turn-on instruction for the low beam occurs,
        wherein the driving circuit is structured to supply the driving circuit having a first amount to the series connection circuit in an on state of the bypass switch and to supply the driving circuit having a second amount which is smaller than the first amount to the series connection circuit in an off state of the bypass switch.

2. The light source module according to claim 1, wherein the first light source is mounted on a first face that is parallel to the ground,
    wherein the second light source is mounted on a third face that is opposite to the first face,
    wherein the first optical system comprises a first reflector provided to the first face side,
    and wherein the second optical system comprises a second reflector provided to the third face side.

3. The light source module according to claim 1, wherein the first light source is mounted on a first face that is parallel to the ground,
wherein the second light source is mounted on a second face that is orthogonal to the ground,
wherein the first optical system comprises a reflective optical system,
and wherein the second optical system comprises a transmissive optical system.

4. The light source module according to claim 1, wherein the first light source comprises a plurality of light-emitting elements arranged adjacent to each other in a horizontal direction.

5. A light source module for a vehicle structured to be switchable between a high beam and a low beam, the light source module comprising:
a first light source arranged such that an output light of the first light source is irradiated to a low-beam region by a first optical system;
a second light source arranged such that an output light of the second light source is irradiated to a high-beam region by a second optical system; and
a lighting circuit structured to supply a driving current to the first light source in response to any one from among a turn-on instruction for the high beam and a turn-on instruction for the low beam, and to supply the driving current to the second light source in response to the turn-on instruction for the high beam,
wherein the first light source and the second light source are coupled in series, and wherein the lighting circuit comprises:
a driving circuit structured to supply the driving current to a series connection circuit of the first light source and the second light source; and
a bypass switch arranged in parallel with the second light source, and structured to be turned off during a period in which the turn-on instruction for the high beam occurs, and to be turned on during a period in which the turn-on instruction for the low beam occurs,
wherein the first light source comprises a first semiconductor light-emitting element and a second semiconductor light-emitting element;
wherein the second light source comprises a third semiconductor light-emitting element; and
wherein the first optical system comprises:
a first lens structured to receive an output light of the first semiconductor light-emitting element so as to form a light distribution for a region below an elbow point of the low-beam region; and
a second lens structured to receive an output light of the second semiconductor light-emitting element so as to form a light distribution for a region above an elbow point of the low-beam region,
and wherein the second optical system comprises a third lens structured to receive an output light of the third semiconductor light-emitting element so as to illuminate the high-beam region.

6. The light source module according to claim 5, wherein the first light source comprises a plurality of light-emitting elements arranged adjacent to each other in a horizontal direction.

7. A light source module for a vehicle structured to be switchable between a high beam and a low beam, the light source module comprising:
a first light source arranged such that an output light of the first light source is irradiated to a low-beam region by a first optical system;
a second light source arranged such that an output light of the second light source is irradiated to a high-beam region by a second optical system; and
a lighting circuit structured to supply a driving current to the first light source in response to any one from among a turn-on instruction for the high beam and a turn-on instruction for the low beam, and to supply the driving current to the second light source in response to the turn-on instruction for the high beam;
a third light source arranged such that an output light of the third light source is irradiated to the low-beam region by the first optical system,
wherein the lighting circuit is structured to supply the driving current to the third light source in response to a turn-on instruction for the low beam, and
wherein the lighting circuit comprises:
a first switch structured to turn on in response to a turn-on instruction for the low beam;
a second switch structured to turn on in response to a turn-on instruction for the high beam; and
a driving circuit structured to generate the driving current,
wherein the first light source, the third light source, and the first switch are coupled in series,
and wherein the second light source and the second switch are coupled in parallel with the third light source and the first switch.

8. The light source module according to claim 7, wherein the first light source and the third light source are mounted on a first face that is parallel to the ground,
wherein the second light source is mounted on a third face that is opposite to the first face,
wherein the first optical system comprises a first reflector provided on the first face side,
and wherein the second optical system comprises a second reflector provided on the third face side.

9. The light source module according to claim 7, wherein the first light source and the third light source are mounted on a first face that is parallel to the ground,
wherein the second light source is mounted on a second face that is orthogonal to the ground,
wherein the first optical system comprises a reflective optical system,
and wherein the second optical system comprises a transmissive optical system.

10. The light source module according to claim 7, wherein the first light source and the third light source comprise a plurality of light-emitting elements arranged adjacent to each other in a horizontal direction.

11. The light source module according to claim 7, wherein the second light source comprises a plurality of light-emitting elements arranged adjacent to each other in a horizontal direction.

12. A light source module for a vehicle structured to be switchable between a high beam and a low beam, the light source module comprising:
a first light source for a low beam;
a first switch arranged in parallel with the first light source;
a second light source for a low beam and a second switch coupled in series with the first light source;

a third light source for a high beam and a third switch arranged in series such that they form a path that is parallel to the second light source and the second switch; and a driving circuit structured to generate a driving current in response to any one from among the high beam turn-on instruction and the low beam turn-on instruction.

13. The light source module according to claim 12, further comprising a controller structured such that, in a normal state, (i) in response to the low beam turn-on instruction, the controller turns off the first switch, turn on the second switch, and turns off the third switch, and (ii) in response to the high beam turn-on instruction, the controller turns off the first switch and the second switch, and turns on the third switch.

14. The light source module according to claim 13, wherein, upon detecting a current cutoff state, the controller sets the first switch to an on state.

15. The light source module according to claim 14, wherein, when the current cutoff state continues over a predetermined first time after the first switch is set to the on state, the controller turns off the first switch.

16. The light source module according to claim 15, wherein the first time is 2 ms to 500 ms.

17. The light source module according to claim 14, wherein, when a state in which the driving current is zero continues over a predetermined second time, the controller judges that a current cutoff state has occurred.

18. The light source module according to claim 14, wherein, during a period in which the first switch is fixedly set to the on state, the controller turns on the second switch regardless of the high beam or the low beam turn-on instruction.

19. The light source module according to claim 14, wherein, during a period in which the first switch is fixedly set to the on state, the controller turns on the third switch regardless of the high beam or the low beam turn-on instruction.

* * * * *